US011996059B2

(12) United States Patent
Jung

(10) Patent No.: US 11,996,059 B2
(45) Date of Patent: May 28, 2024

(54) IMAGE DISPLAY APPARATUS

(71) Applicant: LG ELECTRONICS INC., Seoul (KR)

(72) Inventor: Moongu Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/187,085

(22) Filed: Mar. 21, 2023

(65) Prior Publication Data

US 2023/0306919 A1 Sep. 28, 2023

(30) Foreign Application Priority Data

Mar. 28, 2022 (KR) ........................ 10-2022-0038202

(51) Int. Cl.
*G09G 3/34* (2006.01)
*G09G 3/20* (2006.01)
*G09G 3/36* (2006.01)

(52) U.S. Cl.
CPC ............. *G09G 3/3426* (2013.01); *G09G 3/20* (2013.01); *G09G 3/3648* (2013.01); *G09G 2310/0202* (2013.01); *G09G 2320/0233* (2013.01); *G09G 2320/0247* (2013.01)

(58) Field of Classification Search
CPC ......... G09G 3/30–3291; G09G 3/3426; G09G 3/3648; G09G 2310/0202; G09G 2320/0233; G09G 2320/0247
See application file for complete search history.

(56) References Cited

U.S. PATENT DOCUMENTS

| | | | | |
|---|---|---|---|---|
| 7,808,494 B2 * | 10/2010 | Lee | G09G 3/3648 | 345/206 |
| 9,401,118 B2 * | 7/2016 | Kim | G09G 3/3614 | |
| 9,824,661 B2 * | 11/2017 | Kim | G09G 3/3688 | |
| 10,504,473 B2 * | 12/2019 | Kim | G09G 3/3677 | |
| 2002/0180721 A1 * | 12/2002 | Kimura | G09G 3/3233 | 345/211 |
| 2004/0008165 A1 * | 1/2004 | Yen-Hua | G09G 3/3216 | 345/76 |

(Continued)

FOREIGN PATENT DOCUMENTS

CN 109448649 3/2019

OTHER PUBLICATIONS

European Patent Office Application Serial No. 23163491.6, Search Report dated Aug. 23, 2023, 13 pages.

*Primary Examiner* — Gene W Lee
(74) *Attorney, Agent, or Firm* — LEE, HONG, DEGERMAN, KANG & WAIMEY

(57) ABSTRACT

The present disclosure relates to an image display apparatus. An image display apparatus according to an embodiment of the present disclosure includes a panel, a plurality of light sources for outputting light to the panel, a plurality of data drivers for outputting data signals to the plurality of light sources, and a plurality of gate drivers for outputting gate signals to the plurality of light sources, and among the plurality of light sources, light sources disposed in a first vertical line and light sources disposed in a second vertical line are connected to a first data line. Accordingly, it is possible to display an image by efficiently using the data drivers.

19 Claims, 28 Drawing Sheets

(56) References Cited

U.S. PATENT DOCUMENTS

| | | | | |
|---|---|---|---|---|
| 2008/0129652 | A1* | 6/2008 | Park | G09G 3/3648 345/55 |
| 2008/0224984 | A1 | 9/2008 | Chang | |
| 2009/0102763 | A1 | 4/2009 | Border et al. | |
| 2010/0259512 | A1 | 10/2010 | Lin et al. | |
| 2020/0161386 | A1 | 5/2020 | Lee et al. | |
| 2020/0211482 | A1 | 7/2020 | Pyun et al. | |
| 2021/0020126 | A1* | 1/2021 | Lin | G09G 3/3607 |
| 2021/0049949 | A1* | 2/2021 | Lee | G09G 5/18 |
| 2022/0020313 | A1* | 1/2022 | Yeh | G09G 3/3674 |
| 2022/0310031 | A1* | 9/2022 | Wang | G09G 3/3696 |

* cited by examiner

IMAGE DISPLAY APPARATUS

CROSS-REFERENCE TO RELATED APPLICATIONS

Pursuant to 35 U.S.C. § 119 (a), this application claims the benefit of an earlier filing date and right of priority to Korean Patent Application No. 10-2022-0038202, filed on Mar. 28, 2022, the contents of which are all hereby incorporated by reference herein in their entireties.

BACKGROUND OF THE DISCLOSURE

1. Field of the Disclosure

The present disclosure relates to an image display apparatus, and more particularly, to an image display apparatus capable of displaying images by efficiently using data drivers.

2. Description of the Related Art

An image display apparatus displays images using a panel.

Panels may be classified into a self-emitting panel that emits light by itself, a panel requiring a separate light source such as a liquid crystal panel, and the like.

Meanwhile, when a panel requires a separate light source, a plurality of light sources is provided on the rear surface of the panel, and a driver is used for the plurality of light sources.

In recent years, the number of light sources disposed in an image display apparatus using a liquid crystal panel tends to increase for improvement of resolution.

Meanwhile, as the number of light sources increases, there is a disadvantage in that the number of drivers for driving the light sources increases.

SUMMARY

It is an object of the present disclosure to provide an image display apparatus capable of displaying images by efficiently using data drivers.

It is another object of the present disclosure to provide an image display apparatus capable of reducing a luminance deviation between adjacent light sources.

It is another object of the present disclosure to provide an image display apparatus capable of compensating for an increase in a driving frequency for a light source in a low-grayscale region.

In accordance with an aspect of the present disclosure, the above and other objects can be accomplished by the provision of an image display apparatus including a panel, a plurality of light sources configured to output light to the panel, a plurality of data drivers configured to output data signals to the plurality of light sources, and a plurality of gate drivers configured to output gate signals to the plurality of light sources, wherein among the plurality of light sources, light sources disposed in a first vertical line and light sources disposed on a second vertical line are connected to a first data line.

The data drivers may output a first data signal for driving the light sources disposed in the first vertical line to a first data line during a first period, and output a second data signal for driving the light sources disposed in the second vertical line to the first data line during a second period after the first period.

The data drivers may output a third data signal for driving the light sources disposed in the first vertical line to the first data line during a third period after the second period.

The data drivers may control a first light source disposed in the first vertical line to be turned on during the first period and control a light source disposed in the second vertical line and adjacent to the first light source to be turned on during the second period after the first period.

The data drivers may control a second light source disposed in the first vertical line and positioned adjacently under the first light source to be turned on during the third period after the second period.

The first light source disposed in the first vertical line may be connected to a first row line, and the light source disposed in the second vertical line and adjacent to the first light source may be connected to a second row line under the first row line.

The second light source disposed in the first vertical line and positioned adjacently under the first light source may be connected to a third row line.

The gate drivers may output a first gate signal to the first row line during a first period, output a second gate signal to the second row line during a second period after the first period, and output a third gate signal to the third row line during a third period after the second period.

The gate drivers may control the first light source disposed in the first vertical line to be turned on during the first period, control the light source disposed in the second vertical line and adjacent to the first light source to be turned on during the second period after the first period, and control the second light source disposed in the first vertical line and positioned adjacently under the first light source during the third period after the second period.

The gate drivers may output a first gate signal to the first row line during a first period within a first frame period, output a second gate signal to the second row line during a second period after the first period, output a third gate signal to the third row line during a third period after the second period, output a fourth gate signal to the second row line during a first period within a second frame period after the first frame period, and output a fifth gate signal to the first row line during a second period after the first period.

The data drivers may control some of light sources disposed in a first horizontal line among the plurality of light sources to be turned on during the first period, and control some other light sources to be turned on during the second period after the first period.

The number of data drivers may decrease as the number of light sources commonly connected to the first data line increases.

Frequencies of the data signals and the gate signals may increase as the number of light sources commonly connected to the first data line increases.

The data drivers may output a data signal at a first frequency to the first light source when a grayscale level assigned to the first light source among the light sources disposed in the first vertical line among the plurality of light sources exceeds a first reference level, and output a data signal at a second frequency lower than the first frequency to the first light source when the grayscale level allocated to the first light source is equal to or less than the first reference level.

The data drivers may control a current having a first frequency to flow through the first light source when the grayscale level assigned to the first light source among the light sources disposed in the first vertical line among the plurality of light sources exceeds the first reference level and control a current having a second frequency lower than the first frequency to flow through the first light source when the grayscale level allocated to the first light source is equal to or less than the first reference level.

The data drivers may output a data signal having a first level to the first light source when the grayscale level assigned to the first light source among the light sources disposed in the first vertical line among the plurality of light sources exceeds the first reference level, and output a data signal having a second level lower than the first level to the first light source when the grayscale level allocated to the first light source is equal to or less than the first reference level.

The data drivers may control a current having a first level to flow through the first light source when the grayscale level assigned to the first light source among the light sources disposed in the first vertical line among the plurality of light sources exceeds the first reference level, and control a current having a second level lower than the first level to flow through the first light source when the grayscale level allocated to the first light source is equal to or less than the first reference level.

In accordance with another aspect of the present disclosure, there is provided an image display apparatus including a panel, a plurality of light sources configured to output light to the panel, a plurality of data drivers configured to output data signals to the plurality of light sources, and a plurality of gate drivers configured to output gate signals to the plurality of light sources, wherein among the plurality of light sources, light sources disposed in a first vertical line, light sources disposed in a second vertical line, and light sources disposed in a third vertical line are connected to a first data line.

The data drivers may output a first data signal for driving the light sources disposed in the first vertical line to the first data line during a first period, output a second data signal for driving the light sources disposed in the second vertical line to the first data line during a second period after the first period, and output a third data signal for driving the light sources disposed in the third vertical line to the first data line during a third period after the second period.

In accordance with another aspect of the present disclosure, there is provided an image display apparatus including a panel, a plurality of light sources configured to output light to the panel, a plurality of data drivers configured to output data signals to the plurality of light sources, and a plurality of gate drivers configured to output gate signals to the plurality of light sources, wherein among the plurality of light sources, light sources disposed in a first vertical line, light sources disposed in a second vertical line, light sources disposed in a third vertical line, and light sources disposed in a fourth vertical line are connected to a first data line.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present disclosure, examples of which are illustrated in the accompanying drawings.

The suffixes "module" and "unit" in elements used in description below are given only in consideration of ease in preparation of the specification and do not have specific meanings or functions. Therefore, the suffixes "module" and "unit" may be used interchangeably.

Figure 1:
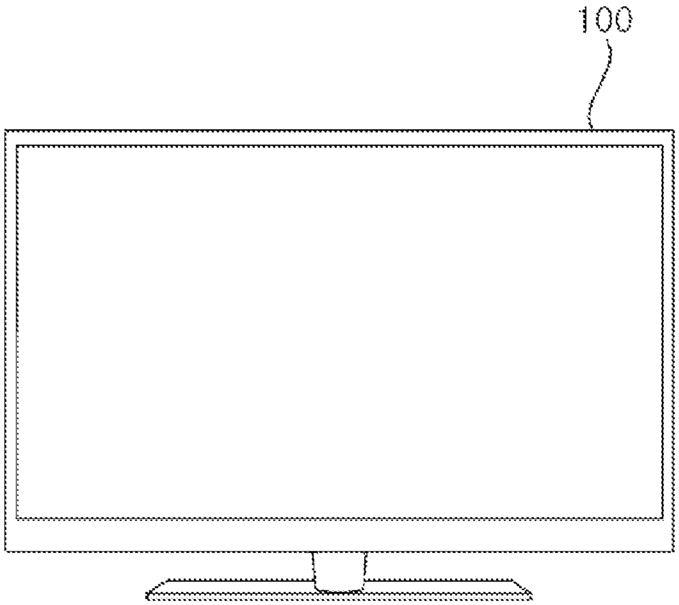
FIG. 1 is a view illustrating an outer appearance of an image display apparatus according to an embodiment of the present disclosure.

FIG. 1 illustrates an outer appearance of an image display apparatus according to an embodiment of the present disclosure.

Referring to FIG. 1, an image display appearance 100 according to an embodiment of the present disclosure may include a display (180 shown in FIG. 2), a controller (170 shown in FIG. 2) for performing a control operation to display images on the display, and a power supply (190 shown in FIG. 2) for supplying power to the display.

On the other hand, when the display 180 includes a liquid crystal panel, a separate light source, for example, an LED and the like are used.

Meanwhile, as resolution of the image display apparatus 100 increases up to high definition (HD), full HD, ultra-high definition (UHD), 4K, 8K, etc., the number of light sources increases.

As the number of light sources increases, the number of data drivers and gate drivers for driving the light sources also increases.

Accordingly, an embodiment of the present disclosure proposes a method for displaying images by efficiently using data drivers in response to an increase in image resolution or an increase in the number of light sources.

To this end, the image display apparatus 100 according to the embodiment of the present disclosure includes a panel (210 shown in FIG. 6), a plurality of light sources (B1 to Bn shown in FIG. 10) for outputting light to the panel, a plurality of data drivers (DC1 to DC3 shown in FIG. 10) for outputting data signals to the plurality of light sources, and a plurality of gate drivers (MC1 to MC5 shown in FIG. 10) for outputting gate signals to the plurality of light sources, and light sources B1 to B4 disposed in a first vertical line and light sources B5 to B8 disposed in a second vertical line among the plurality of light sources B1 to Bn are connected to a first data line Data1.

Accordingly, it is possible to display images by efficiently using the data drivers DC1 to DC3. In particular, the number of data drivers DC1 to DC3 can be significantly reduced as compared to a case in which the light sources B1 to B4 disposed in the first vertical line and the light sources B5 to B8 disposed in the second vertical line are connected to respective data lines instead of a common data line. Specifically, the number of data lines can be reduced to about half. This will be described in more detail with reference to FIG. 10 and the subsequent figures.

Figure 2:
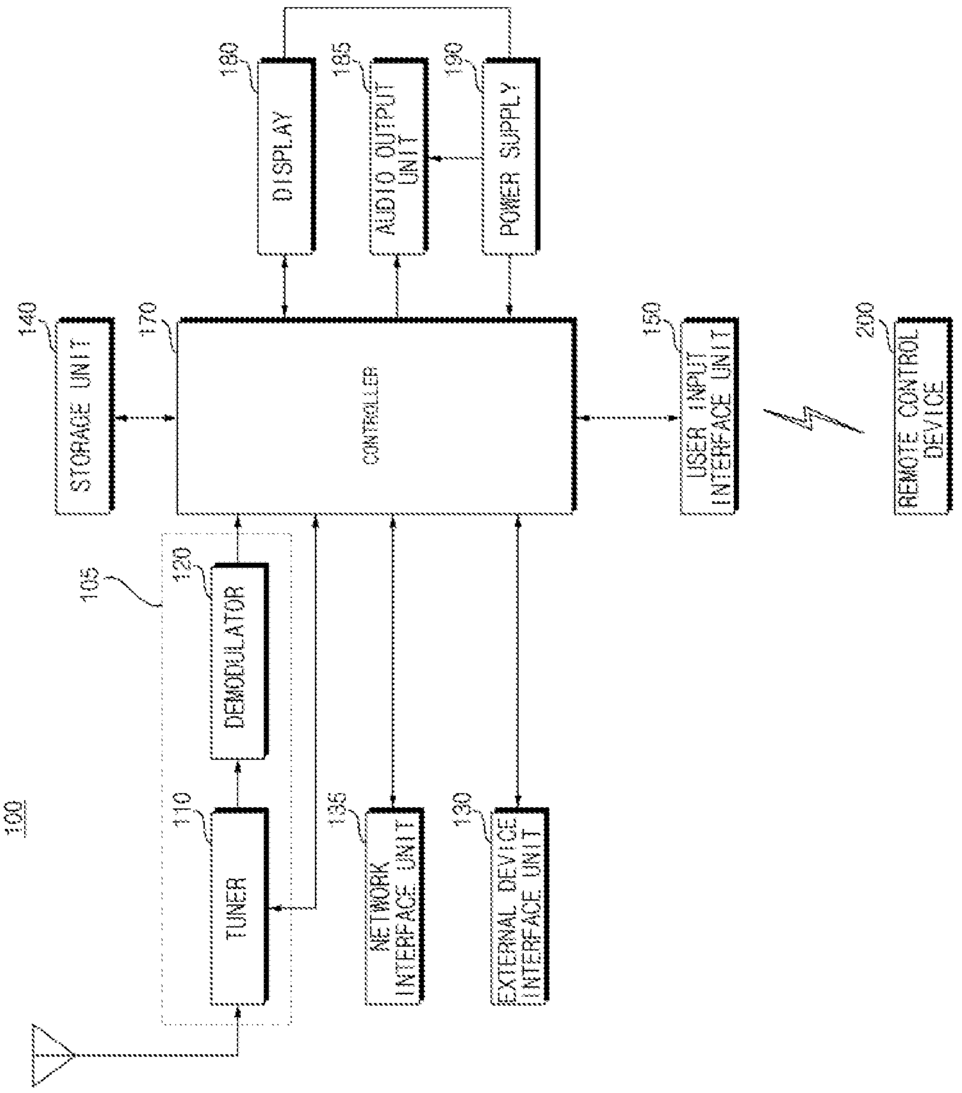
FIG. 2 is an internal block diagram of the image display apparatus of FIG. 1.

FIG. 2 is an internal block diagram of the image display apparatus of FIG. 1.

Referring to FIG. 2, the image display apparatus 100 according to an embodiment of the present disclosure may include a broadcast receiver 105, an external device interface 130, a memory 140, a user input interface 150, a sensor device (not shown), a controller 170, a display 180, and an audio output device 185.

The broadcast receiver 105 may include a tuner 110, a demodulator 120, and a network interface 135. As needed, the broadcast receiver 105 may be designed not to include the network interface 135 while including the tuner 110 and the demodulator 120. In contrast, the broadcast receiver 105 may include only the network interface 135 and does not include the tuner 110 and the demodulator 120.

Unlike FIG. 2, the broadcast receiver 105 may include the external device interface 130. For example, a broadcast signal generated by a set-top box (not shown) may be received through the external device interface 130.

The tuner 110 selects a radio frequency (RF) broadcast signal corresponding to a channel selected by a user or all prestored channels from among RF broadcast signals received through an antenna. In addition, the tuner 110 converts the selected RF broadcast signal into an intermediate frequency (IF) signal, a baseband image, or an audio signal.

For example, if the selected RF broadcast signal is a digital broadcast signal, the tuner 110 converts the digital broadcast signal into a digital intermediate frequency (DIF) signal. If the selected RF broadcast signal is an analog broadcast signal, the tuner 110 converts the analog broadcast signal into an analog baseband image or an audio signal (composite video baseband signal (CVBS)/sound IF (SIF)). That is, the tuner 110 may process a digital broadcast signal or an analog broadcast signal. The analog baseband image or audio signal (CVBS/SIF) output from the tuner 110 may be directly input to the controller 170.

The tuner 110 may sequentially select RF broadcast signals for all broadcast channels stored through a channel memorization function from among RF broadcast signals received through the antenna and convert the same into an IF signal, a baseband image, or an audio signal.

To receive broadcast signals of a plurality of channels, a plurality of tuners 110 may be provided. Alternatively, a single tuner to receive broadcast signals of a plurality of channels simultaneously may be provided.

The demodulator 120 receives and demodulates the DIF signal converted by the tuner 110.

After performing demodulation and channel decoding, the demodulator 120 may output a transport stream (TS) signal. Herein, the stream signal may be a signal obtained by multiplexing an image signal, an audio signal, and a data signal.

The TS signal output from the demodulator 120 may be input to the controller 170. After performing demultiplexing and image/audio signal processing, the controller 170 outputs an image to the display 180 and audio to the audio output device 185.

The external device interface 130 may transmit or receive data to or from an external device connected thereto. To this end, the external device interface 130 may include an audio/video (A/V) input/output device (not shown) or a wireless transceiver (not shown).

The external device interface 130 may be connected to external devices such as a digital versatile disc (DVD), a Blu-ray player, a game console, a camera, a camcorder, a (notebook) computer, and a set-top box in a wired/wireless manner and perform input/output operations with external devices.

The A/V input/output device may receive image and audio signals from an external device. The wireless transceiver may perform short-range wireless communication with other electronic devices.

The network interface 135 provides an interface for connecting the image display apparatus 100 with a wired/wireless network including the Internet. For example, the network interface 135 may receive content or data provided by an Internet or content provider or a network operator over a network.

The memory 140 may store programs for processing and control of signals in the controller 170 and also store a signal-processed image, audio, or data signal.

The memory 140 may function to temporarily store an image signal, an audio signal, or a data signal input through the external device interface 130. In addition, the memory 140 may store information about a predetermined broadcast channel through the channel memorization function such as a channel map.

While an embodiment in which the memory 140 is provided separately from the controller 170 is illustrated in FIG. 2, embodiments of the present disclosure are not limited thereto. The memory 140 may be included in the controller 170.

The user input interface 150 may transmit a signal input by a user to the controller 170 or transmit a signal from the controller 170 to the user.

For example, the user input interface 150 may transmit/receive user input signals such as power on/off, channel selection, and screen window setting to/from the remote control device 200 or transmit user input signals input through local keys (not shown) such as a power key, a channel key, a volume key, or a setting key to the controller 170. The user input interface 150 may transmit user input signals input through a sensor device (not shown) to sense gesture of the user to the controller 170 or transmit a signal from the controller 170 to the sensor device (not shown).

The controller 170 may demultiplex the TS signal input through the tuner 110, the demodulator 120, or the external device interface 130 or process the demultiplexed signal to generate a signal for outputting an image or audio.

The image signal processed by the controller 170 may be input to the display 180 such that an image corresponding to the image signal may be displayed on the display. In addition, the image signal processed by the controller 170 may be input to an external output device through the external device interface 130.

The audio signal processed by the controller 170 may be output to the audio output device 185 in the form of sound. In addition, the audio signal processed by the controller 170 may be input to an external output device through the external device interface 130.

Although not shown in FIG. 2, the controller 170 may include a demultiplexer and an image processor, which will be described with reference to FIG. 3 later.

Additionally, the controller 170 may control an overall operation of the image display apparatus 100. For example, the controller 170 may control the tuner 110 to tune to an RF broadcast corresponding to a channel selected by the user or a prestored channel.

The controller 170 may control the image display apparatus 100 according to a user command input through the user input interface 150 or according to an internal program.

The controller 170 may control the display 180 to display an image. Herein, the image displayed on the display 180 may be a still image, a moving image, a 2D image, or a 3D image.

The controller 170 may control the predetermined 2D object in an image displayed on the display 180 as a 3D object. For example, the object may be at least one of an accessed web page (a newspaper, a magazine, etc.), an electronic program guide (EPG), various menus, a widget, an icon, a still image, a moving image or text.

Such a 3D object may be processed to have a sense of depth different from that of the image displayed on the display 180. Desirably, the 3D object may be processed to appear to protrude from the image displayed on the display 180.

The controller 170 may recognize the location of the user based on an image captured by a capture device (not shown). For example, the controller 170 may recognize the distance between the user and the image display apparatus 100 (i.e., a z-axis coordinate). Additionally, the controller 170 may recognize an x-axis coordinate and y-axis coordinate in the display 180, corresponding to the location of the user.

Although not shown in FIG. 2, the image display apparatus 100 may further include a channel browsing processor for generating a thumbnail image corresponding to a channel signal or an external input signal. The channel browsing processor may receive a TS signal output from the demodulator 120 or a TS signal output from the external device interface 130, extract an image from the received TS signal, and generate a thumbnail image. The generated thumbnail image may be TS-decoded together with a decoded image and then input to the controller 170. The controller 170 may display a thumbnail list including a plurality of thumbnail images on the display 180 using received thumbnail images.

The thumbnail list may be displayed in a brief viewing manner in which the thumbnail list is displayed in a portion of the display 180 on which an image is being displayed or in a full viewing manner in which the thumbnail list is displayed over most of the display 180. Thumbnail images in the thumbnail list may be sequentially updated.

The display 180 generates drive signals by converting an image signal, a data signal, an on-screen display (OSD) signal, and a control signal processed by the controller 170 or an image signal, a data signal, and a control signal received from the external device interface 130.

The display 180 may be a plasma display panel (PDP), a liquid crystal display (LCD), an organic light emitting diode (OLED) display, a flexible display, or a 3D display. For 3D image viewing, the display 180 may be divided into a supplementary display type and a single display type.

In the single display type, a 3D image may be implemented on the display 180 alone without a separate subsidiary device, e.g., glasses. Examples of the single display type may include various types such as a lenticular type and a parallax barrier type.

In the supplementary display type, 3D imagery may be implemented using a subsidiary device as a viewing device (not shown), in addition to the display 180. Examples of the supplementary display type may include various types such as a head-mounted display (HMD) type and a glasses type.

The glasses type may be divided into a passive type such as a polarized glasses type and an active type such as a shutter glasses type. The HMD type may be divided into a passive type and an active type.

The viewing device (not shown) may be 3D glasses that enable 3D image viewing. The 3D glasses (not shown) may be passive-type polarized glasses or active-type shutter glasses. The 3D glasses may also be understood as conceptually including the HMD type.

The display 180 may include a touchscreen and may function as an input device as well as an output device.

The audio output device 185 receives an audio signal processed by the controller 170 and outputs audio.

A capture device (not shown) captures an image of the user. The capture device (not shown) may be implemented using one camera. However, embodiments of the present disclosure are not limited thereto and the capture device (not shown) may be implemented using a plurality of cameras. The capture device (not shown) may be buried in the upper portion of the display 180 of the image display apparatus 100 or may be separately disposed. Information about the image captured by the capture device (not shown) may be input to the controller 170.

The controller 170 may sense user gestures based on the image captured by the capture device (not shown), the signal sensed by the sensor device (not shown), or a combination thereof.

The power supply 190 supplies power to overall parts of the image display apparatus 100. In particular, the power supply 190 may supply power to the controller 170, which may be implemented in the form of system-on-chip (SOC), the display 180 for displaying images, and the audio output device 185 for outputting audio signals.

Specifically, the power supply 190 may include a converter for converting alternating current (AC) power into direct current (DC) power and a DC-DC converter for changing the level of the DC power.

The remote control device 200 transmits a user input signal to the user input interface 150. To this end, the remote control device 200 may use Bluetooth, RF communication, infrared (IR) communication, ultra-wideband (UWB), or ZigBee. In addition, the remote control device 200 may receive an image signal, an audio signal, or a data signal from the user input interface 150 and then display or audibly output the received signal.

The image display apparatus 100 may be a fixed or mobile digital broadcast receiver capable of receiving a digital broadcast.

FIG. 2 is a block diagram of the image display apparatus 100 according to an embodiment of the present disclosure. Some of the constituents of the image display apparatus shown in the diagram may be combined or omitted or other constituents may be added thereto, according to specifications of the image display apparatus 100 as actually implemented. That is, two or more constituents of the image display apparatus 100 may be combined into one constituent or one constituent thereof may be subdivided into two or more constituents, as needed. In addition, a function performed in each block is simply illustrative and specific operations or units of the block do not limit the scope of the present disclosure.

Meanwhile, the image display apparatus 100 may not include the tuner 110 and the demodulator 120 as opposed to FIG. 2. Instead, the image display apparatus 100 may receive and reproduce image content through the network interface 135 or the external device interface 130.

The image display apparatus 100 is an exemplary image signal processing apparatus for processing signals of images stored therein or signals of input images. Another example of the image signal processing apparatus may be the above-described set-top box, DVD player, Blu-ray player, game console, or computer except for the display 180 and the audio output device 185 shown in FIG. 2.

Figure 3:
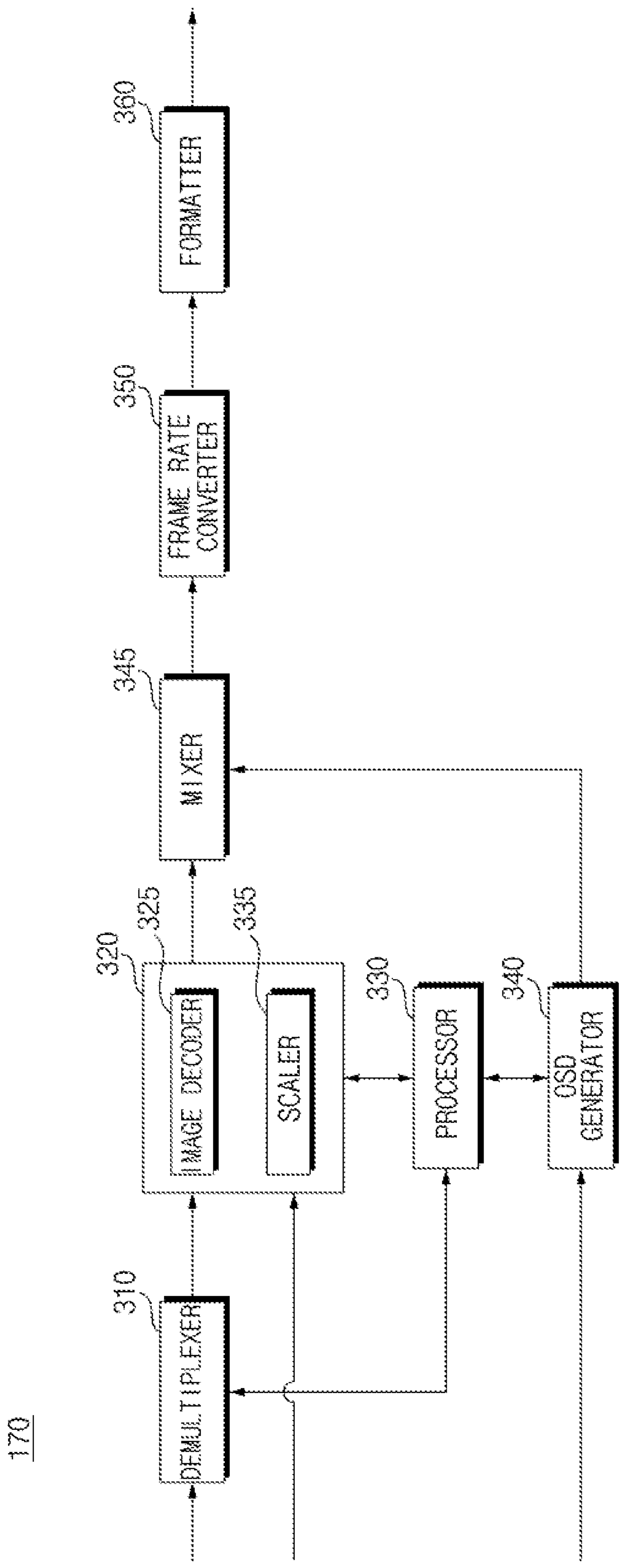
FIG. 3 is an internal block diagram of a controller of the image display apparatus of FIG. 2.

FIG. 3 is an internal block diagram of the controller shown in FIG. 2.

Referring to FIG. 3, the controller 170 according to an embodiment of the present disclosure may include a demultiplexer 310, an image processor 320, a processor 330, an OSD generator 340, a mixer 345, a frame rate converter 350, and a formatter 360. The controller 170 may further include an audio processor (not shown) and a data processor (not shown).

The demultiplexer 310 demultiplexes an input TS signal. For example, when an MPEG-2 TS signal is input, the demultiplexer 310 may demultiplex the MPEG-2 TS signal into an image signal, an audio signal, and a data signal. Herein, the TS signal input to the demultiplexer 310 may be a TS signal output from the tuner 110, the demodulator 120, or the external device interface 130.

The image processor 320 may perform image processing on the demultiplexed image signal. To this end, the image processor 320 may include an image decoder 325 and a scaler 335.

The image decoder 325 decodes the demultiplexed image signal and the scaler 335 scales the resolution of the decoded image signal for outputting the image signal through the display 180.

The image decoder 325 may include various types of decoders.

The image signal decoded by the image processor 320 may include a 2D image signal alone, a mixture of a 2D image signal and a 3D image signal, or a 3D image signal alone.

For example, an external image signal received from an external device or a broadcast image signal of a broadcast signal received through the tuner 110 may include the 2D image signal alone, a mixture of the 2D image signal and the 3D image signal, or the 3D image signal alone. Accordingly, the controller 170, more specifically, the image processor 320, may perform signal processing upon the external image signal or the broadcast image signal to output the 2D image signal, a mixture of the 2D image signal and the 3D image signal, or the 3D image signal.

The image signal decoded by the image processor 320 may include a 3D image signal in various formats. For example, the decoded image signal may be a 3D image signal that includes a color difference image and a depth image or a 3D image signal that includes multi-viewpoint image signals. The multi-viewpoint image signals may include a left-eye image signal and a right-eye image signal, for example.

The formats of the 3D image signal may include a side-by-side format in which the left-eye image L and the right-eye image R are arranged in a horizontal direction, a top/down format in which the left-eye image and the right-eye image are arranged in a vertical direction, a frame sequential format in which the left-eye image and the right-eye image are arranged in a time division manner, an interlaced format in which the left-eye image and the right-eye image are mixed in lines, and a checker box format in which the left-eye image and the right-eye image are mixed in each box.

The processor 330 may control overall operation of the image display apparatus 100 or the controller 170. For example, the processor 330 may control the tuner 110 to tune to an RF broadcasting corresponding to a channel selected by the user or a prestored channel.

In addition, the processor 330 may control the image display apparatus 100 according to a user command input through the user input interface 150 or according to an internal program.

The processor 330 may control data transmission to the network interface 135 or the external device interface 130.

The processor 330 may control operations of the demultiplexer 310, image processor 320 and OSD generator 340 in the controller 170.

The OSD generator 340 generates an OSD signal autonomously or according to a user input signal. For example, the OSD generator 340 may generate a signal for displaying a variety of information in the form of graphics or texts on the screen of the display 180 based on a user input signal. The generated OSD signal may include a variety of data such as a user interface screen, various menu screens, a widget, and an icon of the image display apparatus 100. The generated OSD signal may also include a 2D object or a 3D object.

The OSD generator 340 may generate a pointer which can be displayed on the display, based on a pointing signal input from the remote control device 200. In particular, the pointer may be generated by a pointing signal processor (not shown) and the OSD generator 240 may include the pointing signal generator (not shown). Obviously, it is possible to provide the pointing signal processor (not shown) separately from the OSD generator 240.

The mixer 345 may mix the OSD signal generated by the OSD generator 340 with the image signal decoded by the image processor 320. Each of the OSD signal and the decoded image signal may include at least one of a 2D signal or a 3D signal. The mixed image signal is provided to the frame rate converter 350.

The frame rate converter (FRC) 350 may convert the frame rate of an input image. The FRC 350 may also directly output the input image without frame rate conversion.

The formatter 360 may arrange a left-eye image frame and right-eye image frame of the 3D image produced through frame rate conversion. The formatter 360 may output a synchronization signal Vsync to open a left-eye glass or right-eye glass of a 3D viewing apparatus (not shown).

The formatter 360 may receive the mixed signal, i.e., a mixture of the OSD signal and the decoded image signal, from the mixer 345 and separate the mixed signal into a 2D image signal and a 3D image signal.

The formatter 360 may change the format of the 3D image signal. For example, the formatter 360 may change the format of the 3D image signal to any of the various formats described above.

The formatter 360 may convert the 2D image signal into the 3D image signal. For example, the formatter 360 may detect an edge or a selectable object in the 2D image signal and separate and generate an object according to the detected edge or the selectable object as the 3D image signal, based on a 3D image generation algorithm. In this case, the generated 3D image signal may be separated into the left-eye image signal L and the right-eye image signal R to be aligned, as described above.

Although not shown in the figure, a 3D processor (not shown) for 3-D effect signal processing may be further disposed after the formatter 360. The 3D processor (not shown) may perform processing such as adjustment of brightness, tint, and color of an image signal to improve a 3D effect. For example, the 3D processor may perform signal processing of making parts at a close distance clear and making parts at a far distance blurry. Such functions of the 3D processor may be integrated into the formatter 360 or the image processor 320.

An audio processor (not shown) in the controller 170 may process the demultiplexed audio signal. To this end, the audio processor (not shown) may include various decoders.

The audio processor (not shown) in the controller 170 may perform processing such as adjustment of bass, treble, and volume.

The data processor (not shown) in the controller 170 may perform data processing on the demultiplexed data signal. For example, if the demultiplexed data signal is a coded data signal, the data processor (not shown) may decode the data signal. The coded data signal may be EPG information containing broadcast information such as a start time and end time of a broadcast program broadcast on each channel.

Although the formatter 360 performs 3D processing after the mixer 345 mixes the signals received from the OSD generator 340 and the image processor 320 in FIG. 3, embodiments of the present disclosure are not limited thereto and the mixer 345 may be disposed after the formatter 360. That is, after the formatter 360 performs 3D processing on the output of the image processor 320 and the OSD generator 340 generates the OSD signal and performs 3D processing, the mixer 345 may mix the 3D processed signals.

The block diagram of the controller 170 shown in FIG. 3 is simply illustrative. Constituents of the block diagram may be integrated, added or omitted according to the specifications of the controller 170 as actually implemented.

In particular, the frame rate converter 350 and the formatter 360 may not be provided in the controller 170. Instead, they may be provided individually or provided as one separate module.

Figure 4:
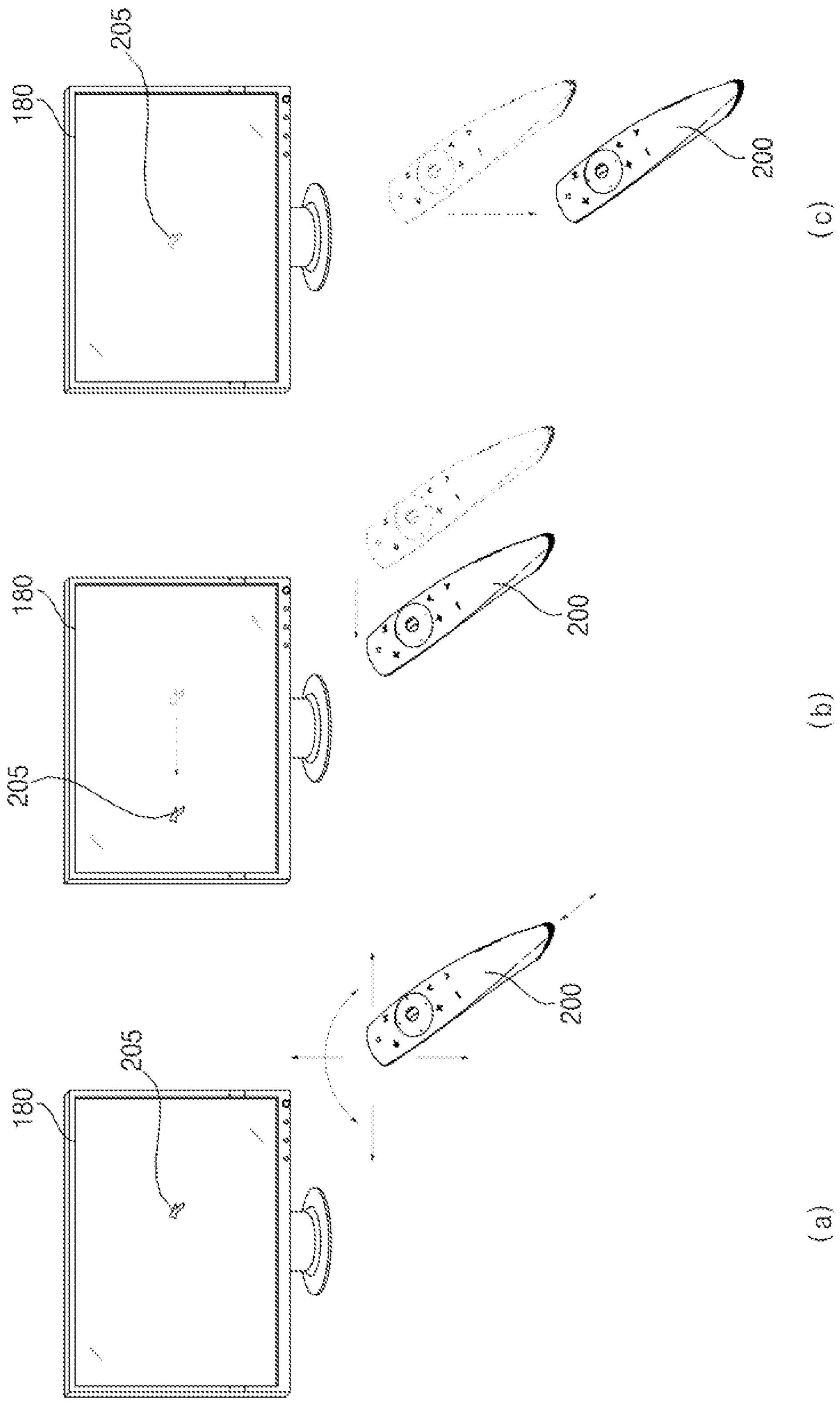
FIG. 4 is a view illustrating a method of controlling a remote control device of the image display apparatus of FIG. 2.

FIG. 4 is a view illustrating a method of controlling the remote control device shown in FIG. 2.

As shown in FIG. 4(*a*), a pointer 205 corresponding to the remote control device 200 may be displayed on the display 180.

A user may move the remote control device 200 up and down, left and right (FIG. 4(*b*)), or back and forth (FIG. 4(*c*)) or rotate the same. The pointer 205 displayed on the display 180 of the image display apparatus moves according to movement of the remote control device 200. As shown in the figure, since the pointer 205 moves according to movement of the remote control device 200 in a 3D space, the remote control device 200 may be referred to as a spatial remote control device or a 3D pointing device.

FIG. 4(*b*) illustrates a case in which the pointer 205 displayed on the display 180 moves to the left when the user moves the remote control device 200 to the left.

Information about movement of the remote control device 200 sensed through a sensor of the remote control device 200 is transmitted to the image display apparatus. The image display apparatus may calculate coordinates of the pointer 205 based on the information about the movement of the remote control device 200. The image display apparatus may display the pointer 205 such that the pointer 205 corresponds to the calculated coordinates.

FIG. 4(*c*) illustrates a case in which the user moves the remote control device 200 away from display 180 while pressing down a specific button on the remote control device 200. In this case, a selected area on the display 180 corresponding to the pointer 205 may be zoomed in and displayed with a magnified size. On the contrary, when the user moves the remote control device 200 closer to the display 180, the selected area may be zoomed out and displayed with a reduced size. Alternatively, the selected area may be zoomed out when the remote control device 200 is moved away from the display 180 and may be zoomed in when the remote control device 200 is moved closer to the display 180.

Up-and-down and left-and-right movements of the remote control device 200 may not be recognized while the specific button on the remote control device 200 is pressed down. That is, when the remote control device 200 moves away from the display 180 or approaches the display 180, the up-and-down and left-and-right movements of the remote control device 200 may not be recognized and only a back-and-forth movement of the remote control device 200 may be recognized. If the specific button on the remote control device 200 is not pressed down, only the pointer 205 moves according to the up-and-down and left-and-right movements of the remote control device 200.

The speed and direction of movement of the pointer 205 may correspond to the speed and direction of movement of the remote control device 200.

Figure 5:
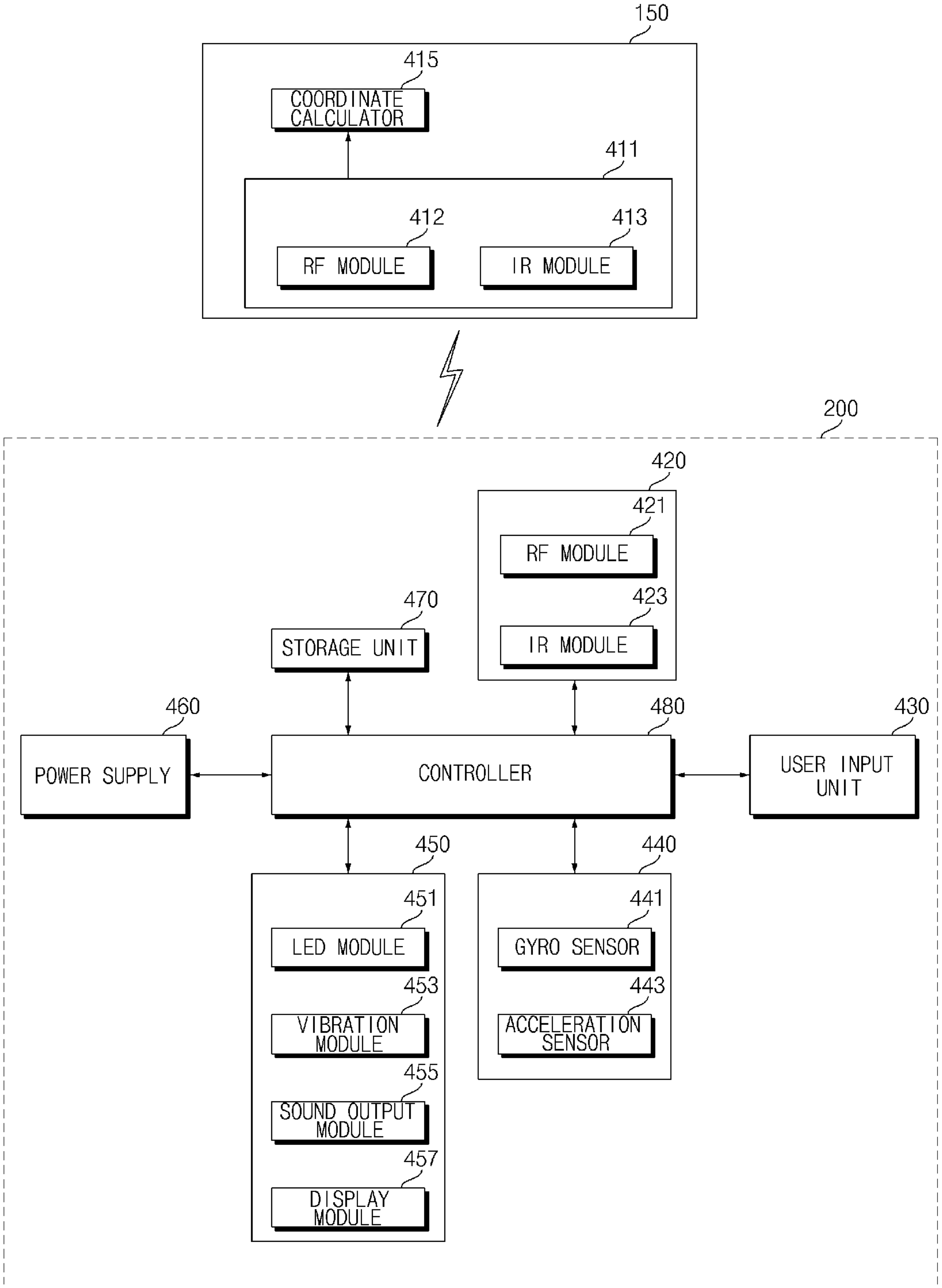
FIG. 5 is an internal block diagram of the remote control device of the image display apparatus of FIG. 2.

FIG. 5 is an internal block diagram of the remote control device shown in FIG. 2.

Referring to FIG. 5, the remote control device 200 may include a wireless transceiver 420, a user input interface 430, a sensor device 440, an output device 450, a power supply 460, a memory 470, and a controller 480.

The wireless transceiver 420 transmits and receives signals to and from one of the image display apparatuses according to embodiments of the present disclosure described above. Hereinafter, one image display apparatus 100 among the image display apparatuses according to embodiments of the present disclosure will be described by way of example.

In this embodiment, the wireless transceiver 420 may include an RF module 421 capable of transmitting and receiving signals to and from the image display apparatus 100 according to an RF communication standard. The wireless transceiver 420 may further include an IR module 423 capable of transmitting and receiving signals to and from the image display apparatus 100 according to an IR communication standard.

In this embodiment, the remote control device 200 transmits a signal containing information about movement of the remote control device 200 to the image display apparatus 100 via the RF module 421.

In addition, the remote control device 200 may receive a signal from the image display apparatus 100 via the RF module 421. As needed, the remote control device 200 may transmit commands related to power on/off, channel change, and volume change to the image display apparatus 100 via the IR module 423.

The user input interface 430 may include a keypad, buttons, a touchpad, or a touchscreen. The user may input a command related to the display apparatus 100 to the remote control device 200 by manipulating the user input interface 430. If the user input interface 430 includes a hard key button, the user may input a command related to the image display apparatus 100 to the remote control device 200 by pressing the hard key button. If the user input interface 430 includes a touchscreen, the user may input a command related to the image display apparatus 100 to the remote control device 200 by touching a soft key on the touchscreen. The user input interface 430 may include various types of input means such as a scroll key and a jog key which can be manipulated by the user and this embodiment does not limit the scope of the present disclosure.

The sensor device 440 may include a gyro sensor 441 or an acceleration sensor 443. The gyro sensor 441 may sense information about movement of the remote control device 200.

For example, the gyro sensor 441 may sense information about movement of the remote control device 200 with respect to the X, Y and Z axes. The acceleration sensor 443 may sense information about the movement speed of the remote control device 200. The sensor device 440 may further include a distance measurement sensor to sense a distance to the display 180.

The output device 450 may output an image signal or audio signal corresponding to manipulation of the user input interface 435 or the signal transmitted by the image display apparatus 100. The user may recognize, via the output device 450, whether the user input interface 435 is manipulated or the image display apparatus 100 is controlled.

For example, the output device 450 may include an LED module 451 to be turned on, a vibration module 453 to generate vibration, a sound output module 455 to output sound, or a display module 457 to output an image, when the user input interface 435 is manipulated or signals are transmitted to and received from the image display apparatus 100 via the wireless transceiver 425.

The power supply 460 supplies power to the remote control device 200. If the remote control device 200 does not move for a predetermined time, the power supply 460 may stop supplying power to reduce waste of power. The power supply 460 may resume supply of power when a predetermined key provided to the remote control device 200 is manipulated.

The memory 470 may store various types of programs and application data necessary for control or operation of the remote control device 200. When the remote control device 200 wirelessly transmits and receives signals to and from the image display apparatus 100 via the RF module 421, the remote control device 200 and the image display apparatus 100 may transmit and receive signals in a predetermined frequency band. The controller 480 of the remote control device 200 may store, in the memory 470, information about a frequency band enabling wireless transmission and reception of signals to and from the image display apparatus 100 which is paired with the remote control device 200, and reference the information.

The controller 480 controls overall operation related to control of the remote control device 200. The controller 480 may transmit a signal corresponding to manipulation of a predetermined key in the user input interface 435 or a signal corresponding to movement of the remote control device 200 sensed by the sensor device 440 to the image display apparatus 100 via the wireless transceiver 420.

The user input interface 150 of the image display apparatus 100 may include a wireless transceiver 411 capable of wirelessly transmitting and receiving signals to and from the remote control device 200 and a coordinate calculator 415 capable of calculating coordinates of a pointer corresponding to operation of the remote control device 200.

The user input interface 150 may wirelessly transmit and receive signals to and from the remote control device 200 via an RF module 412. In addition, the user input interface 150 may receive, via an IR module 413, a signal transmitted from the remote control device 200 according to an IR communication standard.

The coordinate calculator 415 may calculate a coordinate value (x, y) of the pointer 205 to be displayed on the display 180 by correcting hand shaking or errors in a signal corresponding to operation of the remote control device 200, which is received via the wireless transceiver 411.

The signal which is transmitted by the remote control device 200 and input to the image display apparatus 100 via the user input interface 150 is transmitted to the controller 170 of the image display apparatus 100. The controller 170 may determine information about an operation of the remote control device 200 or manipulation of a key from the signal transmitted by the remote control device 200 and control the image display apparatus 100 based on the information.

As another example, the remote control device 200 may calculate a coordinate value of a pointer corresponding to movement thereof and output the coordinate value to the user input interface 150 of the image display apparatus 100. In this case, the user input interface 150 of the image display apparatus 100 may transmit, to the controller 170, information about the received coordinate value of the pointer without separately correcting hand tremor or errors.

As another example, the coordinate calculator 415 may be provided in the controller 170 rather than in the user input interface 150 as opposed to FIG. 5.

Figure 6:
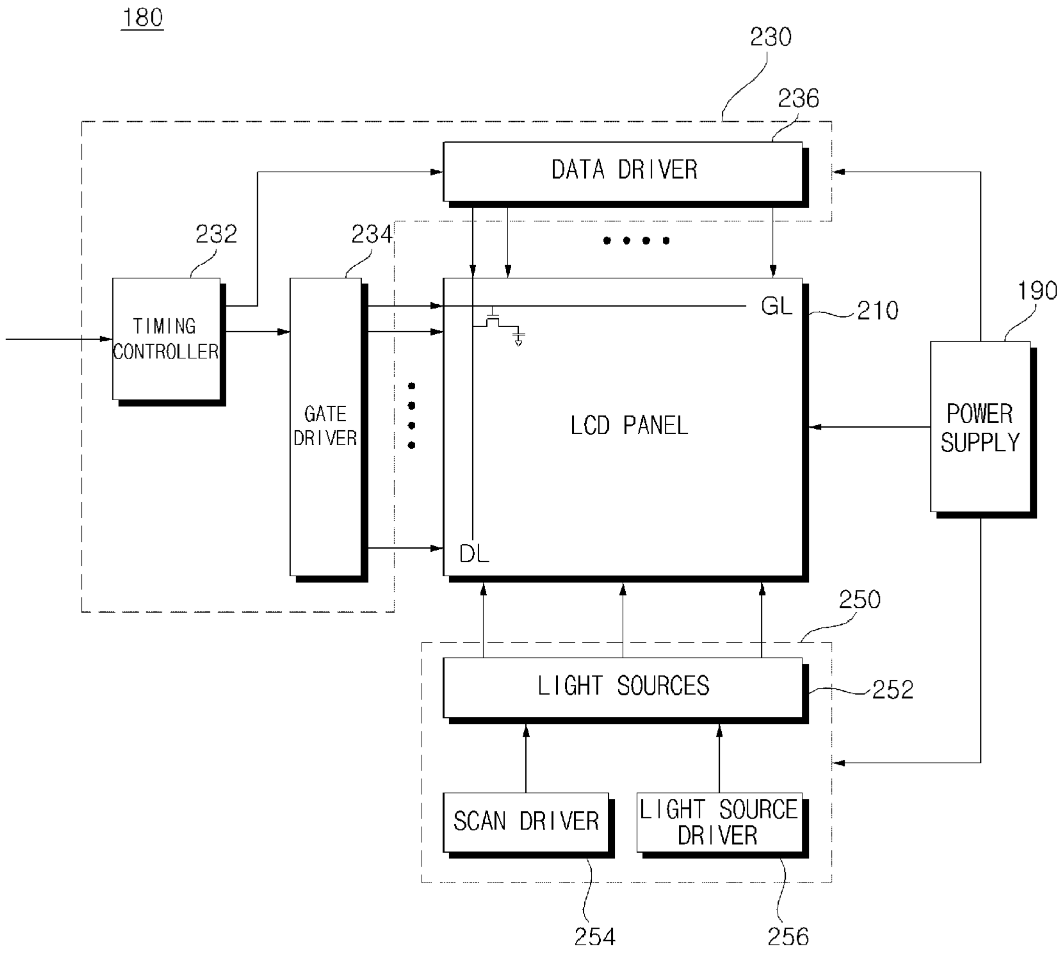
FIG. 6 is a diagram of a power supply and an internal construction of a display shown in FIG. 2.

FIG. 6 is a diagram of the power supply and an internal construction of the display shown in FIG. 2.

Referring to FIG. 6, the LCD panel based display 180 may include an LCD panel 210, a driving circuit 230, and a backlight 250.

To display images, the LCD panel 210 includes a first substrate on which a plurality of gate lines GL and a plurality of data lines DL intersect in a matrix form and thin film transistors (TFTs) and pixel electrodes connected to the TFTs are formed at the intersections, a second substrate including common electrodes, and a liquid crystal layer formed between the first substrate and the second substrate.

The driving circuit 230 drives the LCD panel 210 through a control signal and a data signal supplied by the controller 170 shown in FIG. 2. To this end, the driving circuit 230 includes a timing controller 232, a gate driver 234, and a data driver 236.

The timing controller 232 receives a control signal, an RGB data signal, and a vertical synchronization signal Vsync from the controller 170, controls the gate driver 234 and the data driver 236 based on the control signal, rearranges the RGB data signal, and provides the re-arranged RGB data signal to the data driver 236.

The gate driver 234 and the data driver 236 provide a scan signal and a video signal to the LCD panel 210 through the gate lines GL and the data lines DL under the control of the timing controller 232.

The backlight 250 supplies light to the LCD panel 210. To this end, the backlight 250 may include a plurality of light sources 252, a scan driver 254 for controlling scanning operation of the light sources 252, and a light source driver 256 for turning on or off the light sources 252.

A predetermined image is displayed by light emitted from the backlight 250 in a state in which light transmittance of the liquid crystal layer is controlled by an electrical field between the pixel electrodes and the common electrodes of the LCD panel 210.

The power supply 190 may supply a common electrode voltage Vcom to the LCD panel 210 and a gamma voltage to the data driver 236. In addition, the power supply 190 supplies a driving voltage for driving the light sources 252 to the backlight 250.

Figure 7:
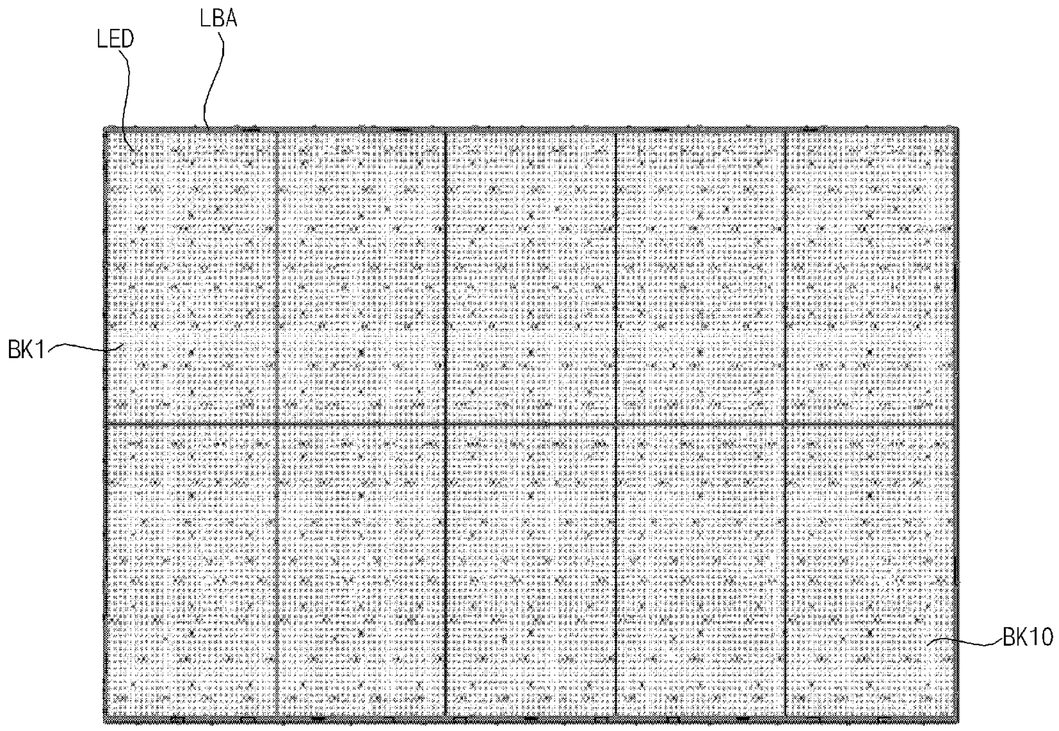
FIG. 7 is a diagram illustrating exemplary arrangement of light sources shown in FIG. 6.

FIG. 7 is a diagram illustrating exemplary arrangement of the light sources shown in FIG. 6.

Referring to FIG. 7, a light source plate LBA including a plurality of light sources may be disposed on the rear surface of the LCD panel 210.

The light source plate LBA may include a plurality of light source block arrays BK1 to BK10, and although ten light source block arrays BK1 to BK10 are illustrated in the figure, various modifications are possible.

Meanwhile, each of the light source block arrays BK1 to BK10 includes a plurality of light sources, and each light source may include an LED.

In this case, when the size of the LED or a distance between LEDs is in mm, the light source plate LBA may be a mini LED-based light source plate.

Alternatively, when the size of the LED or the distance between LEDs is in μm, the light source plate LBA may be a micro LED-based light source plate.

Figure 8:
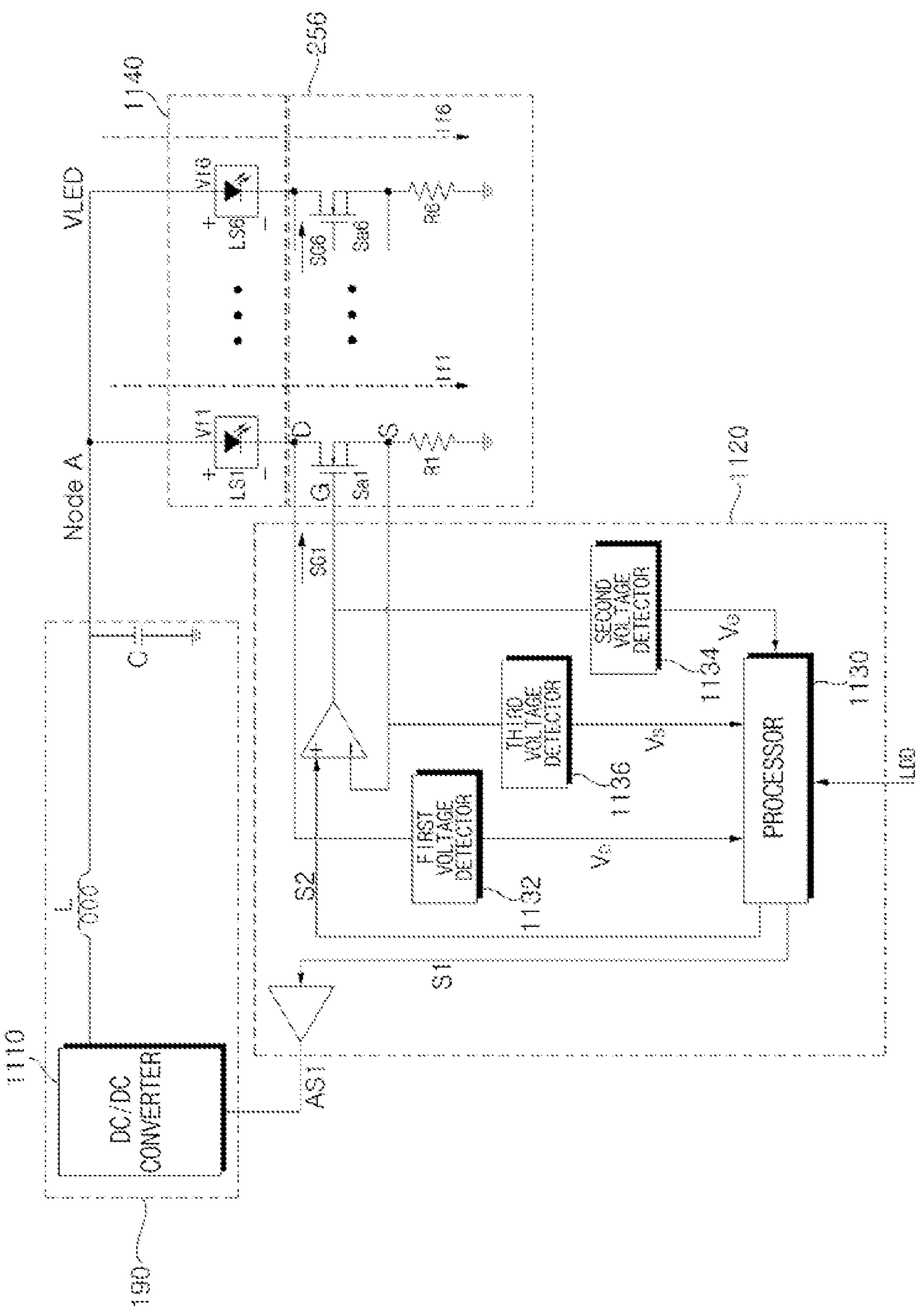
FIG. 8 is an exemplary partial circuit diagram of the image display apparatus of FIG. 1.

FIG. 8 is an exemplary partial circuit diagram of the image display apparatus of FIG. 1.

Referring to FIG. 8, the image display apparatus 100 may include a plurality of light sources LS1 to LS6 1140 connected in parallel to each other, the power supply 190 for supplying a common power voltage VLED to the light sources LS1 to LS6 1140, the light source driver 256 for driving the light sources LS1 to LS6 1140, and a driving controller 1120 for controlling the light source driver 256.

Here, the light sources LS1 to LS6 may correspond to the plurality of light sources as shown in FIG. 7.

As described above, as resolution of the image display apparatus 100 increases up to HD, full HD, UHD, 4K, or 8K, the number of LEDs may increase.

Meanwhile, when the panel 210 is a high resolution panel, it is desirable to allow currents If of variable levels to flow into the light sources 252-1 to 252-6 among the light sources 252 based on local dimming data in order to improve contrast.

According to this, the currents If of variable levels flow in proportion to the local dimming data so that each of the light sources 252-1 to 252-6 outputs light of different luminance according to the local dimming data.

Then, luminance of a bright part becomes brighter and luminance of a dart part becomes darker due to the current If of an increased level. As a result, contrast is improved in displaying images.

The power supply 190 outputs the common voltage VLED to the light sources. To this end, the power supply 190 may include a DC/DC converter for converting the level of a DC power, an inductor L for eliminating harmonics, and a capacitor C for storing the DC power.

A voltage across both ends of the capacitor C may correspond to a voltage supplied between a node A and a ground terminal and correspond to a voltage applied to the light sources LS1 to LS6 1140, a plurality of switching elements Sa1 to Sa6, and resistor elements R1 to R6. That is, the voltage of the node A is a common voltage supplied to the light sources LS1 to LS6 and may be referred to as a VLED voltage as shown.

The VLED voltage is equal to the sum of a driving voltage Vf1 of the first light source LS1, a voltage of both ends of the first switching element Sa, and a voltage consumed in the first resistor element Ra.

Alternatively, the VLED voltage is equal to the sum of a driving voltage Vf2 of the second light source LS2, a voltage of both ends of the second switching element Sa2, and a voltage consumed in the second resistor element Rb. Alternatively, the VLED voltage is equal to the sum of a driving voltage Vf6 of the sixth light source LS6, a voltage of both ends of the sixth switching element Sa6, and a voltage consumed in the sixth resistor element R6.

Meanwhile, as resolution of the panel 210 increases, the light source driving voltages Vf1 to Vf6 increase and driving currents If1 to If6 flowing into the light sources also increase. Accordingly, power consumed by the switching elements Sa1 to Sa6 and the resistor elements R1 to R6 increases and thus stress of the switching elements Sa1 to Sa6 and the resistor R1 to R6 also increases.

To reduce power consumption while the light sources are driven, it is desirable to reduce the driving currents If1 to If6 flowing into the switching elements Sa1 to Sa6 and the resistor elements R1 to R6. In this case, it is assumed that the light source driving voltages Vf1 to Vf6 are constant.

To this end, the driving controller 1120 includes a first voltage detector 1132 for detecting a voltage VD of a drain terminal D of each of the switching elements Sa1 to Sa6 configured by FETs. The driving controller 1120 may further include a second voltage detector 1134 for detecting a voltage VG of a gate terminal G of each of the switching elements Sa1 to Sa6 and a third voltage detector 1136 for detecting a voltage VS of a source terminal S of each of the switching elements Sa1 to Sa6.

The driving controller 1120 may compare drain terminal voltages VD of the respective drain terminals of the switching elements Sa1 to Sa6 with each other, generate target driving currents flowing into the light sources 1140 based on a minimum drain terminal voltage among the drain terminal voltages, and generate switching control signals SG corresponding to the generated target driving currents.

Each switching control signal SG is input to a comparator. If the level of the switching control signal SG is greater than the voltage VS of the source terminal, the switching control signal SG is output from the comparator and input to the gate terminal G. Consequently, the switching element is driven based on the switching control signal SG.

To generate the switching control signal, the driving controller 1120 may include a processor 1130 that generates the switching control signal for driving the gate terminal of each of the switching elements Sa1 to Sa6 based on the voltage of the drain terminal of each of the switching elements Sa1 to Sa6.

The processor 1130 may vary the level of the switching control signal SG based on the magnitude of the voltage VD of the drain terminal of each of the switching elements Sa1 to Sa6.

Meanwhile, the processor 1130 may vary the level of the switching control signal SG or the duty of the switching control signal SG based on the magnitude of the voltage VD of the drain terminal of each of the switching elements Sa1 to Sa6.

To improve contrast in displaying images, the processor 1130 may perform control to allow the current If having a variable level to flow into each of the light sources 252-1 to 252-6 among the light sources 252, based on the local dimming data.

Meanwhile, the processor 1130 may perform control to allow the current If having sequentially varied levels to flow into the light sources 252-1 to 252-6 among the light sources 252, based on the local dimming data.

The processor 1130 may set a potential difference Vds between the drain terminal and source terminal of each of the switching elements Sa1 to Sa6 in the first mode to be smaller than that in the second mode.

As the level of the local dimming data increases, the processor 1130 may set a difference between the potential difference Vds between the drain terminal and the source terminal of each of the switching elements Sa1 to Sa6 in the second mode and that in the first mode to increase.

The processor 1130 may perform control to allow the level of the common voltage output from the power supply to be constant in each frame.

Figure 9A:
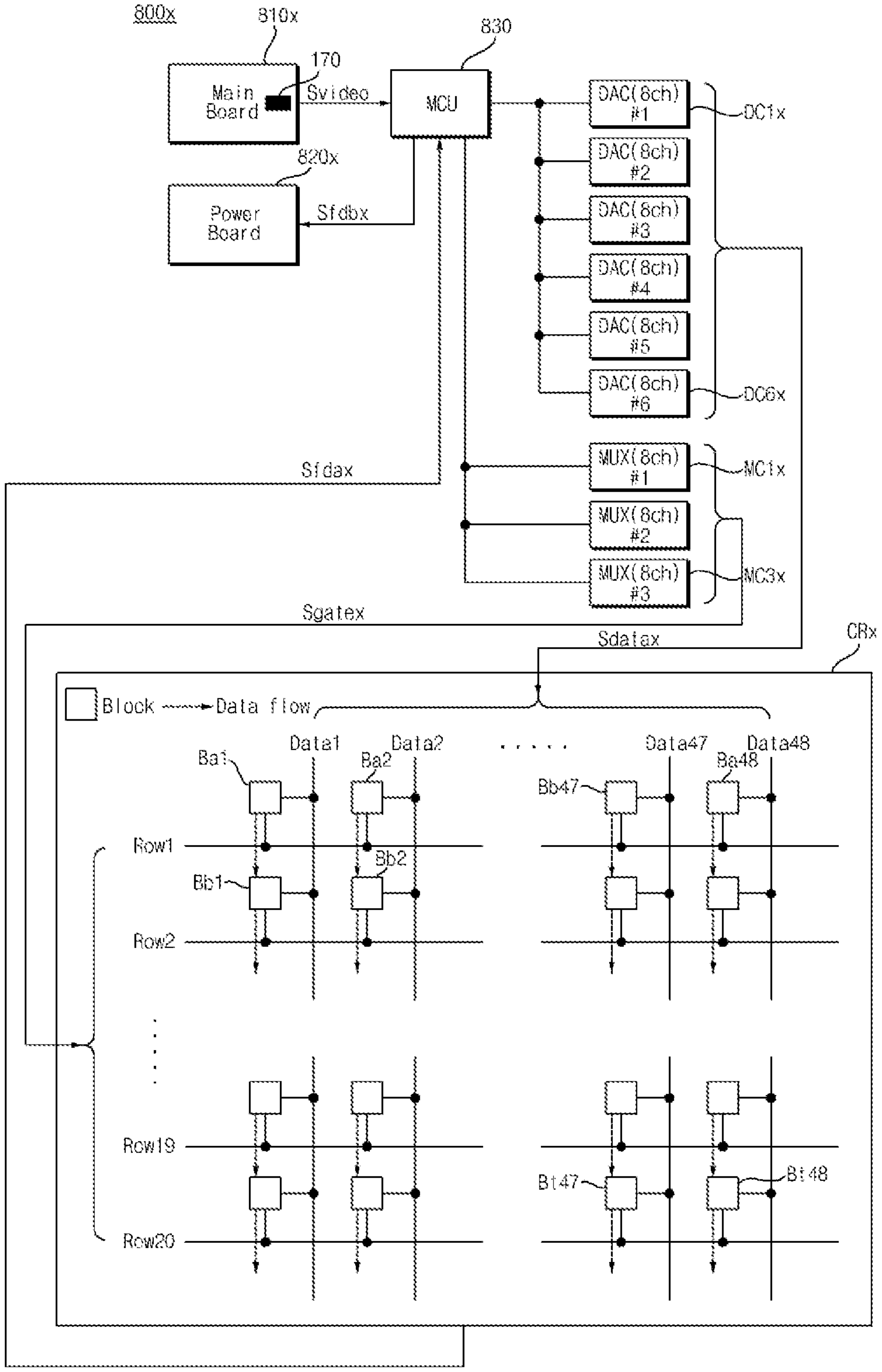
FIGS. 9A to 9C are views referred to in description of the operation of an image display apparatus relating to the present disclosure.
Figure 9B:
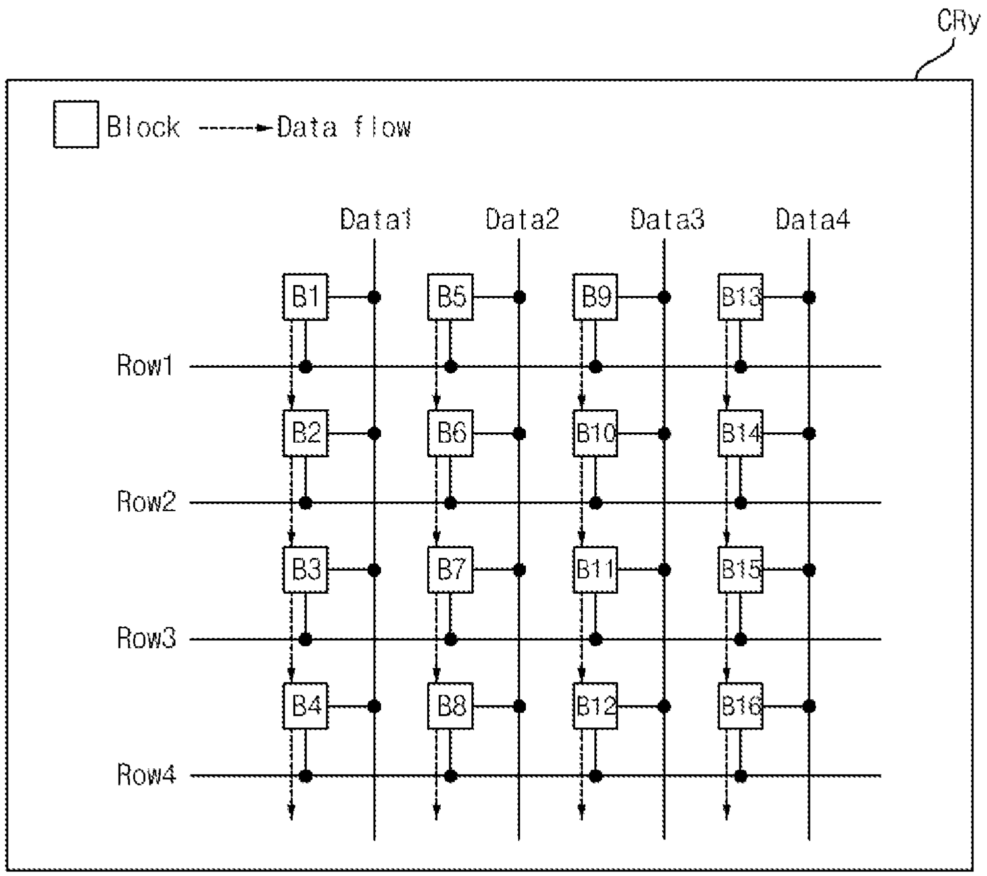
Figure 9C:
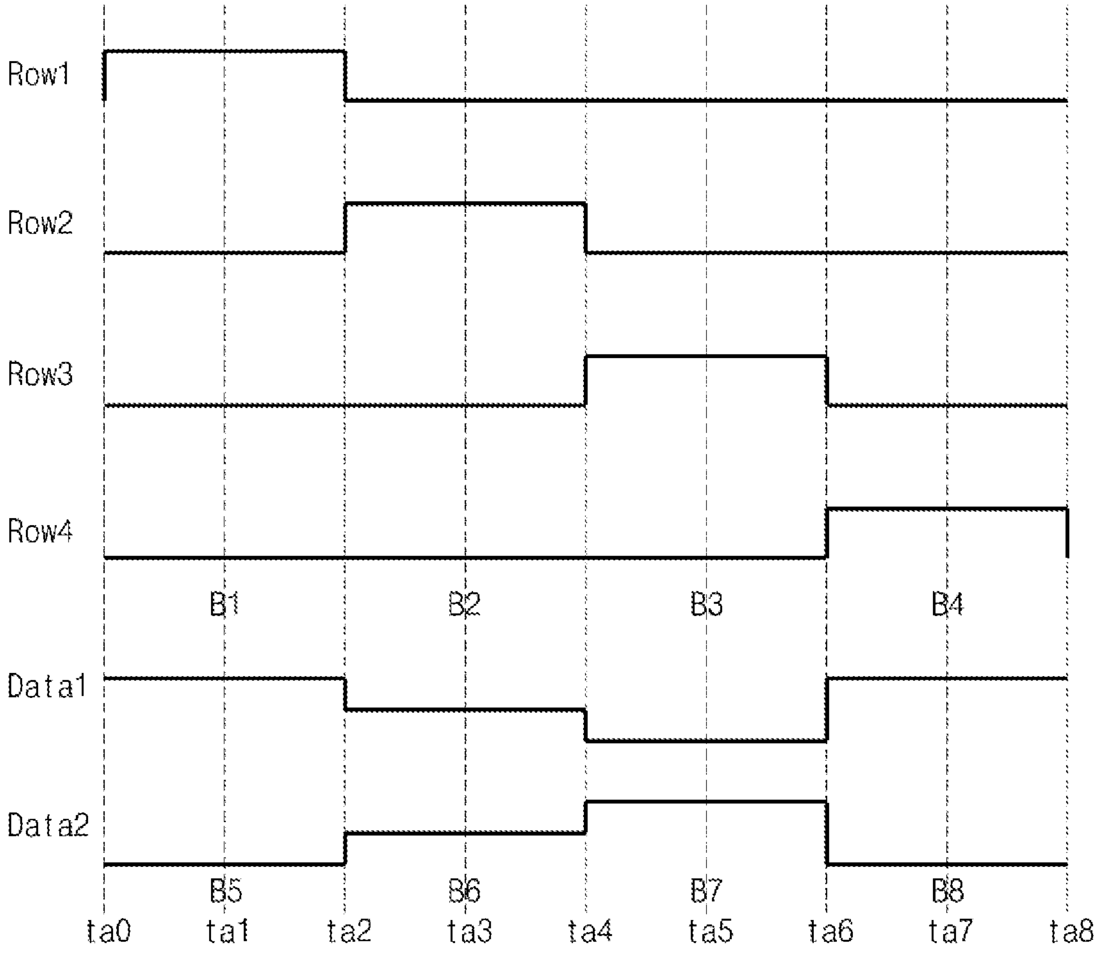

FIGS. 9A to 9C are views referred to in description of the operation of an image display apparatus related to the present disclosure.

Referring to FIG. 9A, the image display device 800*x* relating to the present disclosure may include a plurality of light sources Ba1 to Bt48 that output light to a panel 210, a plurality of data drivers DC1*x* to DC6*x* that output data signals to the plurality of light sources Ba1 to Bt48, and a plurality of gate drivers MC1*x* to MC3*x* that output gate signals to the plurality of light sources Ba1 to Bt48.

Meanwhile, the plurality of data drivers DC1*x* to DC6*x* and the plurality of gate drivers MC1*x* to MC3*x* may be controlled by a processor 830.

The processor 830 may receive a video data signal Svideo from a controller 170 in a main board 810*x* and may receive operating power from a power board 820*x*.

FIG. 9A illustrates a light source circuit CRx including the plurality of light sources Ba1 to Bt48 and arrangement of data lines and row lines.

Among the plurality of light sources Ba1 to Bt48, the light sources Ba1 to Bt1 disposed in a first vertical line are connected to a first data line Data1, the light sources Ba2 to Bt2 disposed in a second vertical line are connected to a second data line Data2, and the light sources Ba48 to Bt48 disposed in a forty-eighth vertical line are connected to a forty-eighth data line Data48.

That is, according to FIG. 9A, light sources per vertical line among the plurality of light sources Ba1 to Bt48 are connected to each data line.

Among the plurality of light sources Ba1 to Bt48, the light sources Ba1 to Ba48 disposed in a first horizontal line are connected to a first row line Row1, the light sources Bb1 to Bb48 disposed in a second horizontal line are connected to a second row line Row2, and the light sources Bt1 to Bt48 disposed in a twentieth horizontal line are connected to a twentieth row line Row20.

That is, according to FIG. 9C, light sources per horizontal line among the plurality of light sources Ba1 to Bt48 are connected to each row line.

As shown in the figure, when the plurality of light sources Ba1 to Bt48 are arranged in twenty horizontal lines and forty-eight vertical lines, six data drivers DC1*x* to DC6*x* that output data signals to eight data lines are required, and three gate drivers MC1*x* to MC3*x* that output gate signals to eight row lines are required.

FIG. 9B illustrates a light source circuit CRy different from the light source circuit CRx of FIG. 9A.

Referring to the figure, the light source circuit CRy according to the present disclosure includes a plurality of light sources B1 to B16.

Among the plurality of light sources B1 to B16, the light sources B1 to B4 disposed in the first vertical line are connected to the first data line Data1, the light sources B5 to B8 disposed in the second vertical line are connected to the second data line Data2, the light sources B9 to B12 disposed in the third vertical line are connected to the third data line Data3, and the light sources B13 to B16 disposed in the fourth vertical line are connected to the fourth data line Data4.

That is, according to FIG. 9B, light sources per vertical line among the plurality of light sources B1 to B16 are connected to each data line.

On the other hand, among the plurality of light sources B1 to B16, the light sources B1, B5, B9, and B13 disposed in the first horizontal line are connected to the first row line Row1, the light sources B2, B6, B10, and B14 disposed in the second horizontal line are connected to the second row line Row2, the light sources B3, B7, B11, and B15 disposed in the third horizontal line are connected to the third row line Row3, and the light sources B4, B8, B12, and B16 disposed on in fourth horizontal line are connected to the fourth row line Row4.

That is, according to FIG. 9B, light sources per horizontal line among the plurality of light sources B1 to B16 are connected to each row line.

FIG. 9C is a diagram referred to in description of the operation of FIG. 9B.

Referring to the figure, gate signals having a high level are sequentially applied to the first to fourth row lines Row1 to Row4.

That is, a first gate signal having a high level is applied to the first row line Row1 during a period from ta0 to ta2, a second gate signal having a high level is applied to the second row line Row2 during a period from ta2 to ta4, a third gate signal having a high level is applied to the third row line Row3 during a period from ta4 to ta6, and a fourth gate signal having a high level is applied to the fourth row line Row4 during a period from ta6 to ta8.

Meanwhile, during the period from ta0 to ta8, a first data signal is applied to the first data line Data1, a second data signal is applied to the second data line Data2, a third data signal is applied the third data line Data3, and a fourth data signal is applied to the fourth data line Data4.

The drawing illustrates that the first data signal having a variable level is applied to the first data line Data1 and the second data signal having a variable level is applied to the second data line Data2.

According to the gate signal and data signals of FIG. 9C, the first light source B1, the fifth light source B5, the ninth light source B9, and the thirteenth light source B13 disposed in the first horizontal line are turned on during the period from ta0 to ta2, the second light source B2, the sixth light source B6, the tenth light source B10, and the fourteenth light source B14 disposed in the second horizontal line are turned on during the period from ta2 to ta4, the third light source B3, the seventh light source B7, the eleventh light source B11, and the fifteenth light source B15 disposed in the third horizontal line are turned on during the period from ta4 to ta6, and the fourth light source B4, the eighth light source B8, the twelfth light source B12, and the sixteenth light source B16 disposed on the fourth horizontal line are turned on during the period from ta6 to ta8.

That is, according to the gate signals and the data signals of FIG. 9C, light sources disposed in the same horizontal line can be simultaneously turned on.

However, when light sources per vertical line are connected to each data line, as shown in FIGS. 9A to 9C, there is a disadvantage in that the number of data drivers for driving light sources increases as the number of vertical lines increases, that is, as the number of light sources increases. Accordingly, an embodiment of the present disclosure proposes a method for displaying images by efficiently using data drivers despite an increase in the number of light sources. This will be described with reference to FIG. 10 and subsequent figures.

Figure 10:
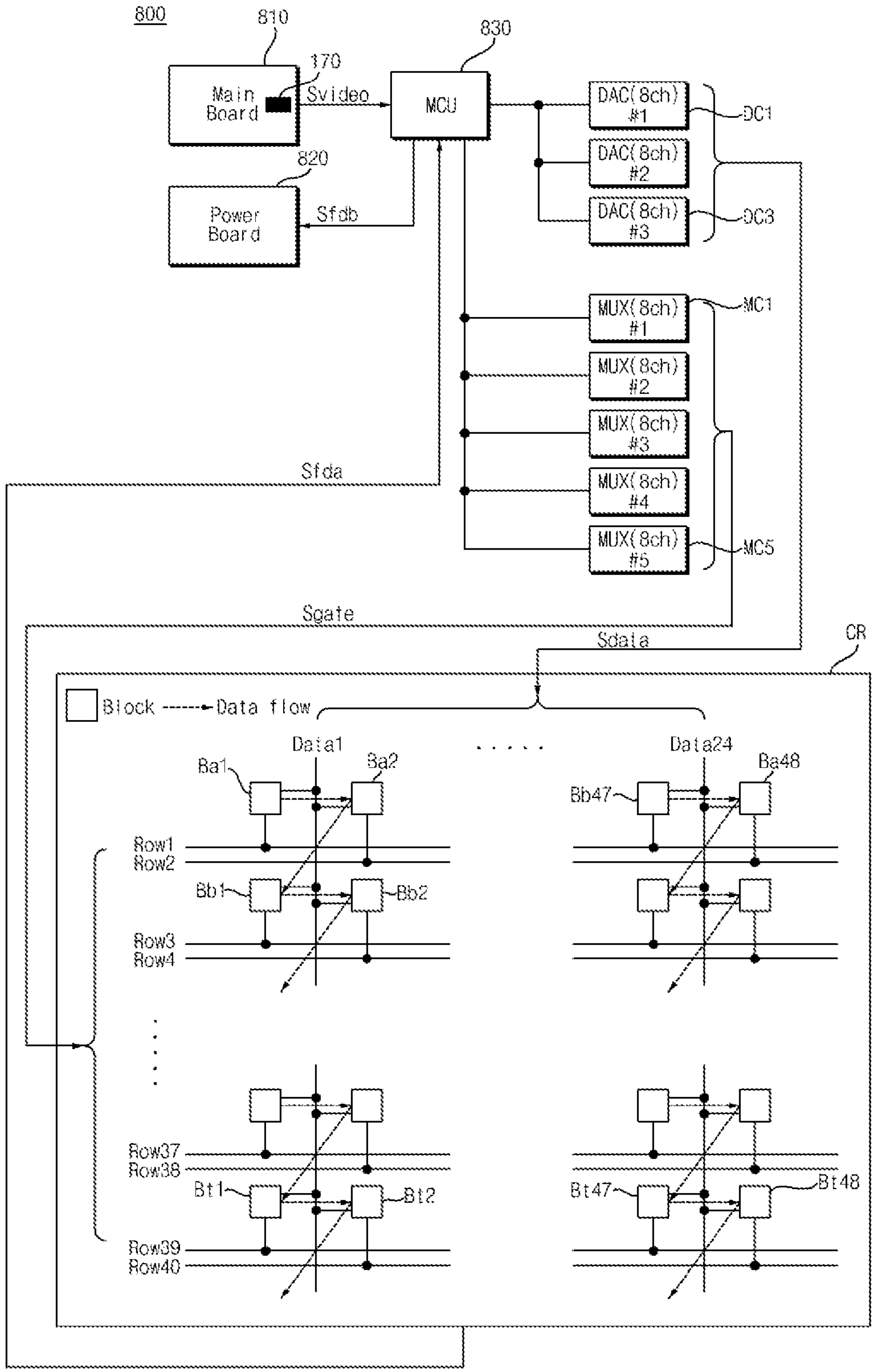
FIG. 10 is an exemplary internal block diagram of an image display apparatus according to an embodiment of the present disclosure.

FIG. 10 is an exemplary internal block diagram of an image display apparatus according to an embodiment of the present disclosure.

Referring to the figure, an image display apparatus 800 according to an embodiment of the present disclosure may include a panel 210, a plurality of light sources Ba1 to Bt48 that output light to the panel 210, a plurality of data drivers DC1 to DC3 that output data signal Sdata to the plurality of light sources Ba1 to Bt48, and a plurality of gate drivers MC1 to MC5 that output gate signals Sgate to the plurality of light sources Ba1 to Bt48.

Meanwhile, the plurality of data drivers DC1 to DC3 and the plurality of gate drivers MC1 to MC5 may be controlled by a processor 830.

The processor 830 may receive a video data signal Svideo from a controller 170 in a main board 810 and receive operating power from a power board 820.

Meanwhile, in the figure, a light source circuit CR including the plurality of light sources Ba1 to Bt48 and arrangement of data lines and row lines is illustrated.

The processor 830 may receive a feedback signal Dfda detected by the light source circuit CR and transmit a signal corresponding to the feedback signal Dfda to the power board 820.

The feedback signal Dfda detected by the light source circuit CR may include voltage information detected by a first voltage detector 1132, a second voltage detector 1134, a third voltage detector 1136 or the like of FIG. 8.

The processor 830 of FIG. 10 may correspond to the processor 1130 of FIG. 8.

Meanwhile, among the plurality of light sources Ba1 to Bt48, the light sources Ba1 to Bt1 disposed in the first vertical line are connected to the first data line Data1, and the light sources Ba2 to Bt2 disposed in the second vertical line are connected to the first data line Data1.

Further, among the plurality of light sources Ba1 to Bt48, the light sources Ba3 to Bt3 disposed in the third vertical line are connected to the second data line Data2, and the light sources Ba4 to Bt4 disposed in the fourth vertical line are connected to the second data line Data2.

Similarly, among the plurality of light sources Ba1 to Bt48, the light sources Ba47 to Bt47 disposed in the forty-seventh vertical line are connected to the twenty-fourth data line Data24, and the light sources Ba48 to Bt48 disposed in the forty-eighth vertical line are connected to the twenty-fourth data line Data24.

That is, according to FIG. 10, one data line is connected to two vertical lines in which light sources among the plurality of light sources Ba1 to Bt48 are disposed.

Meanwhile, light sources Ba1, Ba3, . . . , Ba47 from among the light sources Ba1 to Ba48 disposed in the first horizontal line among the plurality of light sources Ba1 to Bt48 are connected to the first row line Row1, and light sources Ba2, Ba4, . . . Ba48 from among the light sources Ba1 to Ba48 disposed in the first horizontal line among the plurality of light sources Ba1 to Bt48 are connected to the second row line Row2.

Light sources Bb1, Bb3, . . . , Bb47 from among the light sources Bb1 to Bb48 disposed in the second horizontal line among the plurality of light sources Ba1 to Bt48 are connected to the third row line Row3, and light sources Bb2, Bb4, . . . Bb48 from among the light sources Bb1 to Bb48 disposed in the second horizontal line among the plurality of light sources Ba1 to Bt48 are connected to the fourth row line Row4.

Similarly, light sources Bt1, Bt3, . . . , Bt47 from among the light sources Bt1 to Bt48 disposed in the twentieth horizontal line among the plurality of light sources Ba1 to Bt48 are connected to the thirty-ninth row line Row39, and light sources Bt2, Bt4, . . . , Bt44 from among the light sources Bt1 to Bt48 disposed in the twentieth horizontal line among the plurality of light sources Ba1 to Bt48 are connected to the fortieth row line Row40.

That is, according to FIG. 10, two row lines are connected to one horizontal line in which light sources among the plurality of light sources Ba1 to Bt48 are disposed.

As shown, when the plurality of light sources Ba1 to Bt48 are arranged in twenty horizontal lines and forty-eight vertical lines, three data drivers DC1 to DC3 outputting data signals to eight data lines are required, and five gate drivers MC1 to MC5 outputting gate signals to eight row lines are required.

That is, as compared to the image display apparatus 800*x* of FIG. 9A in which six data drivers are used, three data drivers DC1 to DC3 are used in the image display apparatus 800 of FIG. 10. Accordingly, the number of data drivers can be reduced to about half. As a result, it is possible to display images by efficiently using the data drivers DC1 to DC3.

Meanwhile, as compared to the image display apparatus 800*x* of FIG. 9A in which three gate drivers are used, two more gate drivers MC1 to MC5 are used in the image display apparatus 800 of FIG. 10.

However, despite the increase in the number of gate drivers, the manufacturing cost of the image display apparatus 800 of FIG. 10 can be further reduced because the number of expensive data drivers is reduced.

FIGS. 11A to 14B are views referred to in description of FIG. 10.

Figure 11A:
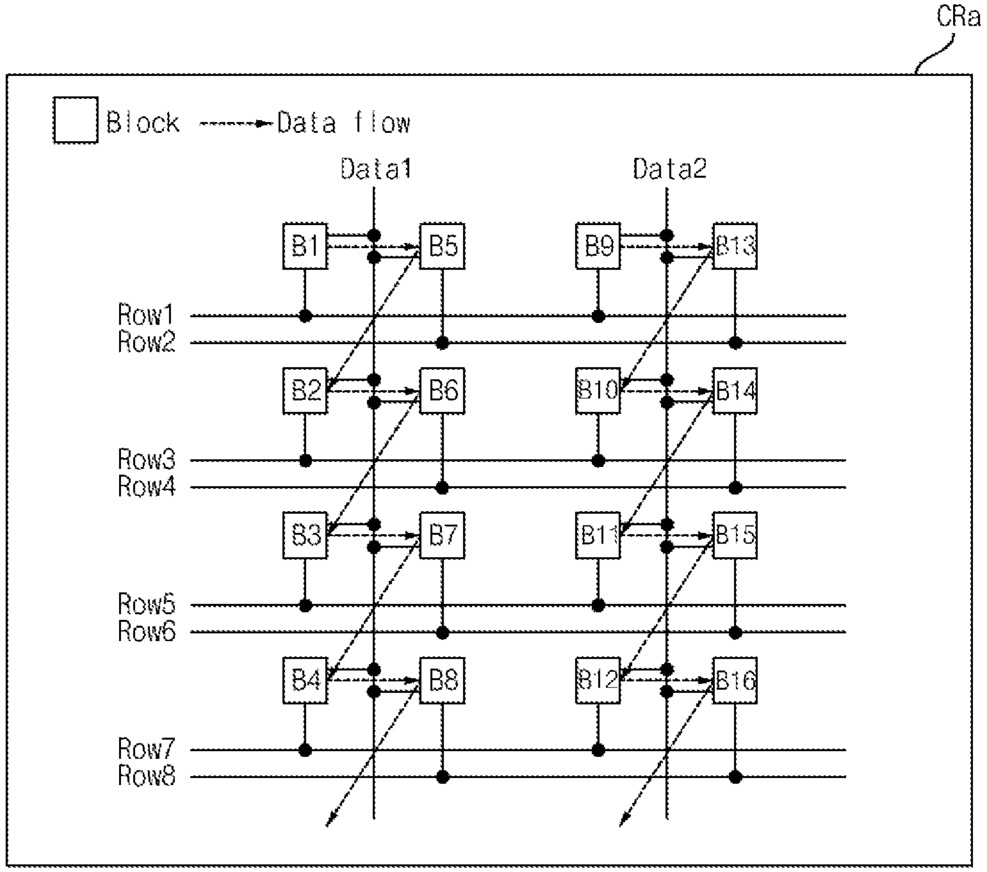
FIGS. 11A to 14B are views referred to in description of FIG. 10.

FIG. 11A illustrates a light source circuit CRa different from the light source circuit CR of FIG. 10.

Referring to the figure, the light source circuit CRa according to an embodiment of the present disclosure includes a plurality of light sources B1 to B16.

Among the plurality of light sources B1 to B16, the light sources B1 to B4 disposed in the first vertical line and the light sources B5 to B8 disposed in the second vertical line are connected to a common first data line Data1.

Accordingly, it is possible to display an image by efficiently using data drivers. In particular, as compared to a case in which the light sources B1 to B4 disposed in the first vertical line and the light sources B5 to B8 disposed in the second vertical line are connected to respective data lines instead of a common data line, it is possible to significantly reduce the number of data drivers. Specifically, it can be reduced to about half.

Meanwhile, among the plurality of light sources B1 to B16, the light sources B9 to B12 disposed in the third vertical line and the light sources B13 to B16 disposed in the fourth vertical line are connected to a common second data line Data2.

As compared to the light source circuit CRy of FIG. 9B, the number of data lines is reduced by half according to the light source circuit CRa of FIG. 11A, and thus the number of data drivers can be reduced by about half.

Meanwhile, among the plurality of light sources B1 to B16, some B1 and B9 of the light sources B1, B5, B9, and B13 disposed in the first horizontal line are connected to the first row line Row1, and some B5 and B13 are connected to the second row line Row2.

Further, among the plurality of light sources B1 to B16, some B2 and B10 of the light sources B2, B6, B10, and B14 disposed in the second horizontal line are connected to the third row line Row3, and some B6 and B14 are connected to the fourth row line Row4.

Further, among the plurality of light sources B1 to B16, some B3 and B11 of the light sources B3, B7, B11, and B15 disposed in the third horizontal line are connected to the fifth row line Row5, and some B7 and B15 are connected to the sixth row line Row6.

Among the plurality of light sources B1 to B16, some B4 and B12 of the light sources B4, B8, B12, and B16 disposed in the fourth horizontal line are connected to the seventh row line Row7, and some B8 and B16 are connected to the eighth row line Row8.

As compared to the light source circuit CRy of FIG. 9B, the number of row lines is doubled according to the light source circuit CRa of FIG. 11A, and thus the number of gate drivers can be approximately doubled.

Figure 11B:
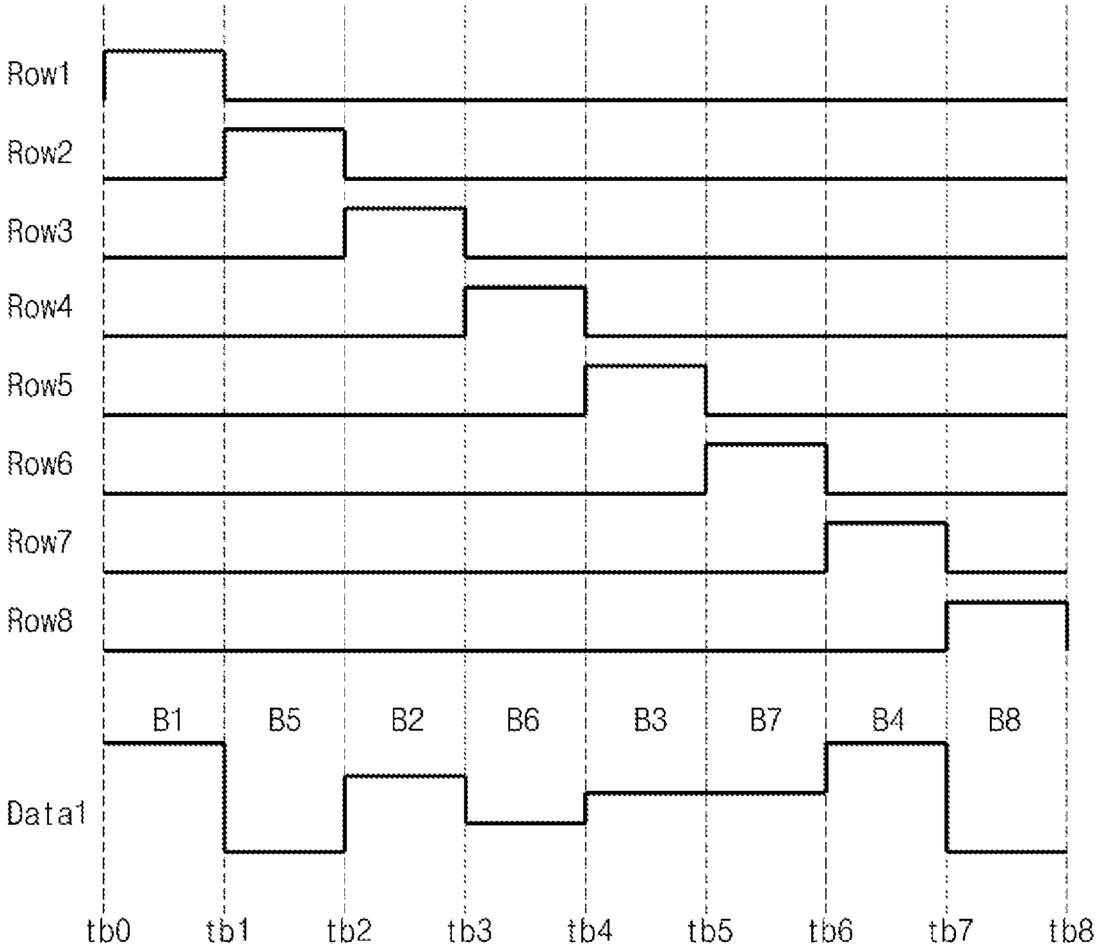

FIG. 11B is a view referred to in description of the operation of FIG. 11A.

Referring to the figure, gate signals having a high level are sequentially applied to the first to eighth row lines Row1 to Row8.

That is, a first gate signal having a high level is applied to the first row line Row1 during a period from tb0 to tb1, a second gate signal having a high level is applied to the second low line Row2 during a period from tb1 to tb2, a third gate signal having a high level is applied to the third row line Row3 during a period from tb2 to tb3, a fourth gate signal having a high level is applied to the fourth row line Row4 during a period from tb3 to tb4, a fifth gate signal having a high level is applied to the fifth row line Row5 during a period from 0tb4 to tb5, a sixth gate signal having a high level is applied to the sixth row line Row6 during a period from tb5 to tb6, a seventh gate signal having a high level is applied to the seventh row line Row7 during a period from tb6 to tb7, and an eighth gate signal having a high level is applied to the eighth row line row8 during a period from tb7 to tb8.

Meanwhile, a first data signal is applied to the first data line Datb1 during the period from tb0 to tb1 and a second data signal is applied to the first data line Datb1 during the period from tb1 to tb2. Accordingly, the first light source B1 is turned on during the period from tb0 to tb1 and the fifth light source B5 horizontally adjacent to the first light source B1 is turned on during the period from tb1 to tb2.

Similarly, the first data signal is applied to the first data line Datb1 during the period from tb2 to tb3 and the second data signal is applied to the first data line Datb1 during the period from tb3 to tb4. Accordingly, the second light source B2 positioned below the first light source B1 is turned on during the period from tb2 to tb3 and the sixth light source B6 horizontally adjacent to the second light source B2 is turned on during the period from tb3 to tb4.

According to the gate signals and data signals of FIG. 11B, the first light source B1 and the ninth light source B9, which are some of the light sources disposed in the first horizontal line, are turned on during the period from tb0 to tb1, and the fifth light source B5 and the thirteenth light source B13, which are some of the light sources disposed on the first horizontal line, are turned on during the period from tb1 to tb2 after the period from tb0 to tb1.

Similarly, the second light source B2 and the tenth light source B10, which are some of the light sources disposed in the second horizontal line, are turned on during the period from tb2 to tb3, and the sixth light source B6 and the fourteenth light source B14, which are some of the light sources disposed in the second horizontal line are turned on during the period from tb3 to tb4.

Meanwhile, the third light source B3 and the eleventh light source B11, which are some of the light sources disposed in the third horizontal line, are turned on during the period from tb4 to tb5, and the seventh light source B7 and the fifteenth light source B15, which are some of the light sources disposed in the third horizontal line, are turned on during the period from tb5 to tb6.

The fourth light source B4 and the twelfth light source B12, which are some of the light sources disposed in the fourth horizontal line, are turned on during the period from tb6 to tb7, and the eighth light source B8 and the sixteenth light source B16, which are some of the light sources disposed in the fourth horizontal line, are turned on during the period from tb7 to tb8.

That is, according to the gate signals and the data signals of FIG. 11B, some of the light sources disposed in the same horizontal line are turned on in a first period, and others are turned on in a second period after the first period. Accordingly, it is possible to display an image while efficiently using data drivers.

As a result, according to FIGS. 10 to 11*b*, the data driver DC1 may output the first data signal for driving the light sources disposed in the first vertical line to the first data line Data1 during the first period from tb0 to tb2 and output the second data signal for driving the light sources disposed in the second vertical line to the first data line Data1 during the second period from tb1 to tb2. Accordingly, it is possible to display an image by efficiently using the data driver DC1.

Further, the data driver DC1 may output the third data signal for driving the light sources disposed in the first vertical line to the first data line Data1 during the third period from tb2 to tb3 after the second period. Accordingly, it is possible to display an image by efficiently using the data driver DC1.

Further, the data driver DC1 may control the first light source B1 disposed in the first vertical line to be turned on during the first period from tb0 to tb1 and control the light source B5 disposed in the second vertical line and adjacent to the first light source B1 to be turned during the second period from tb1 to tb2 after the first period. Accordingly, it is possible to display an image by efficiently using the data driver DC1.

Further, the data driver DC1 may control the second light source B2 disposed in the first vertical line and positioned adjacently under the first light source B1 to be turned on during the third period from tb2 to tb3 after the second period.

The first light source B1 disposed in the first vertical line may be connected to the first row line Row1 and the light source B5 disposed in the second vertical line and adjacent to the first light source B1 may be connected to the second row line Row2 under the first row line Row1. Accordingly, it is possible to display an image by efficiently using the data driver DC1.

The second light source B2 disposed in the first vertical line and positioned adjacently under the first light source B1 may be connected to the third row line Row3. Accordingly, it is possible to display an image by efficiently using the data driver DC1.

Meanwhile, the gate driver MC1 may output the first gate signal to the first row line Row1 during the first period from tb0 to tb1, output the second gate signal to the second row line Row2 during the second period from tb1 to tb2 after the first period, output the third gate signal to the third row line Row3 during the third period from tb2 to tb3 after the second period. Accordingly, it is possible to display an image by efficiently using the data driver DC1.

Further, the gate driver MC1 may control the first light source B1 disposed in the first vertical line to be turned on during the first period from tb0 to tb1, control the light source B5 disposed in the second vertical line and adjacent to the first light source B1 to be turned on during the second period from tb1 to tb2 after the first period, and control the light source B2 disposed in the first vertical line and positioned adjacently under the first light source B1 to be turned on during the third period from tb2 to tb3 after the second period. Accordingly, it is possible to display an image by efficiently using the data driver DC1.

Meanwhile, the data driver DC1 may control some B1 and B9 of the light sources disposed in the first horizontal line among a plurality of light sources B1 to Bn to be turned on during the first period from tb0 to tb1 and control other light sources B5 and B14 to be turned on during the second period from tb1 to tb2 after the first period. Accordingly, it is possible to display an image by efficiently using the data driver DC1.

Figure 12A:
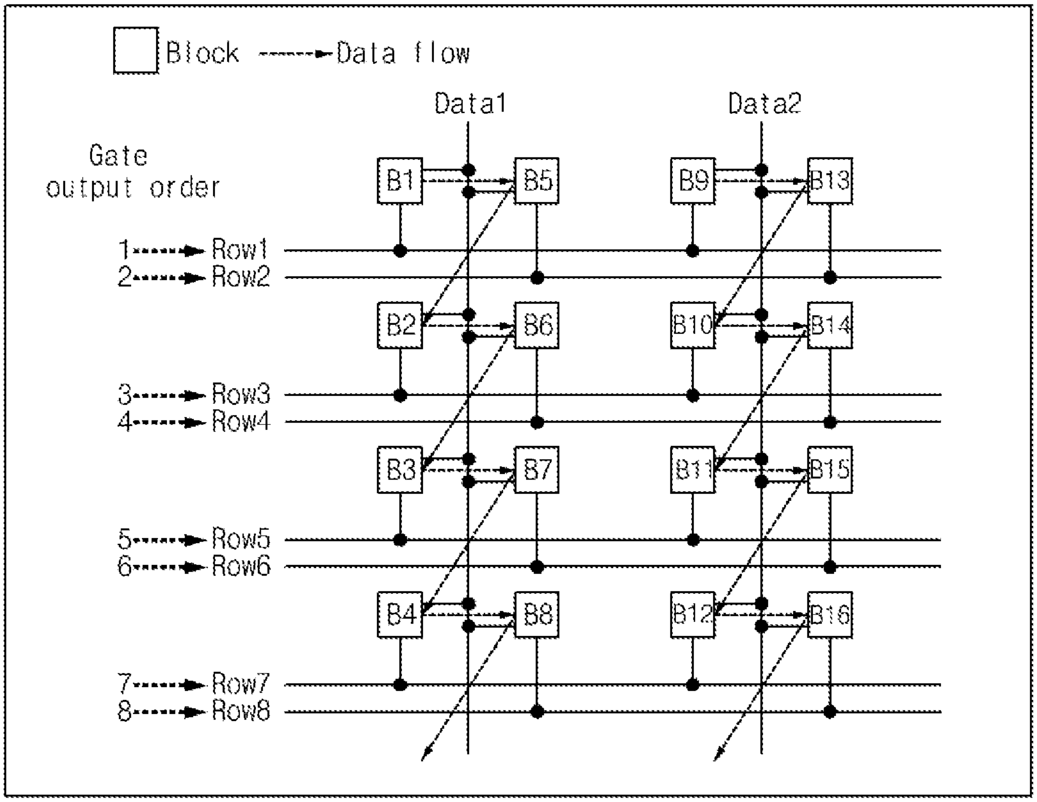
Figure 12B:
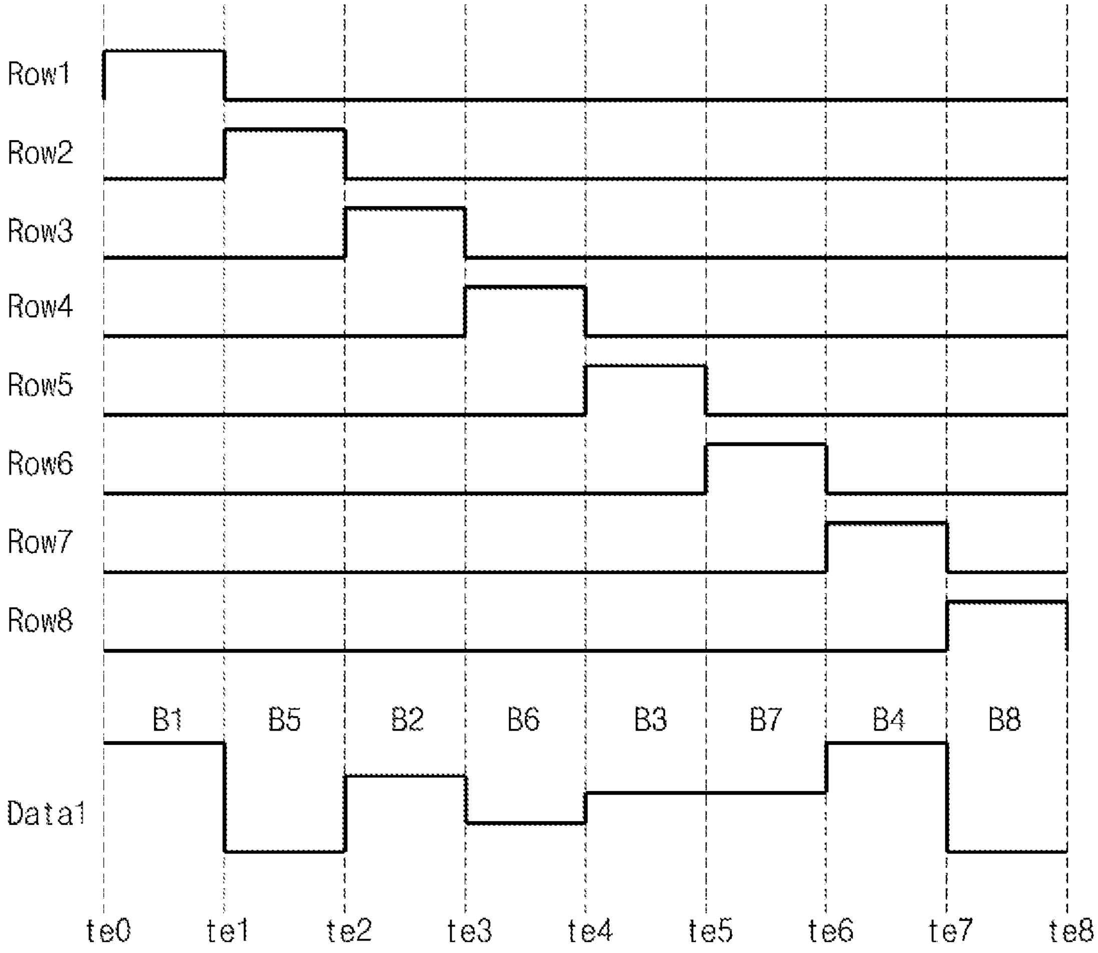

FIGS. 12A and 12B are views illustrating gate signals supplied during a first frame period. Referring to the figures, the gate driver MC1 outputs the first gate signal to the first row line Row1 during a first period from te0 to te1 within a first frame period, outputs the second gate signal to the second row line Row2 during a second period from te1 to te2 after the first period, outputs the third gate signal to the third row line Row3 during a third period from te2 to te3 after the second period, and outputs the fourth gate signal to the fourth row line Row4 during a fourth period from te3 to te4 after the third period.

As shown, by sequentially applying the gate signals to the first row line Row1 to the fourth row line Row4, the light source B1 in the first horizontal line is turned on during the first period from te0 to te1 within the first frame period, the fifth light source B5 adjacent to the first light source B1 in the first horizontal line is turned on during the second period from te1 to te2 within the first frame period, the second light source B2 in the second horizontal line is turned on during the third period from te2 to te3 within the first frame period, and the sixth light source B6 adjacent to the second light source B2 in the second horizontal line is turned on during the fourth period from te3 to te4 within the first frame period.

Figure 12C:
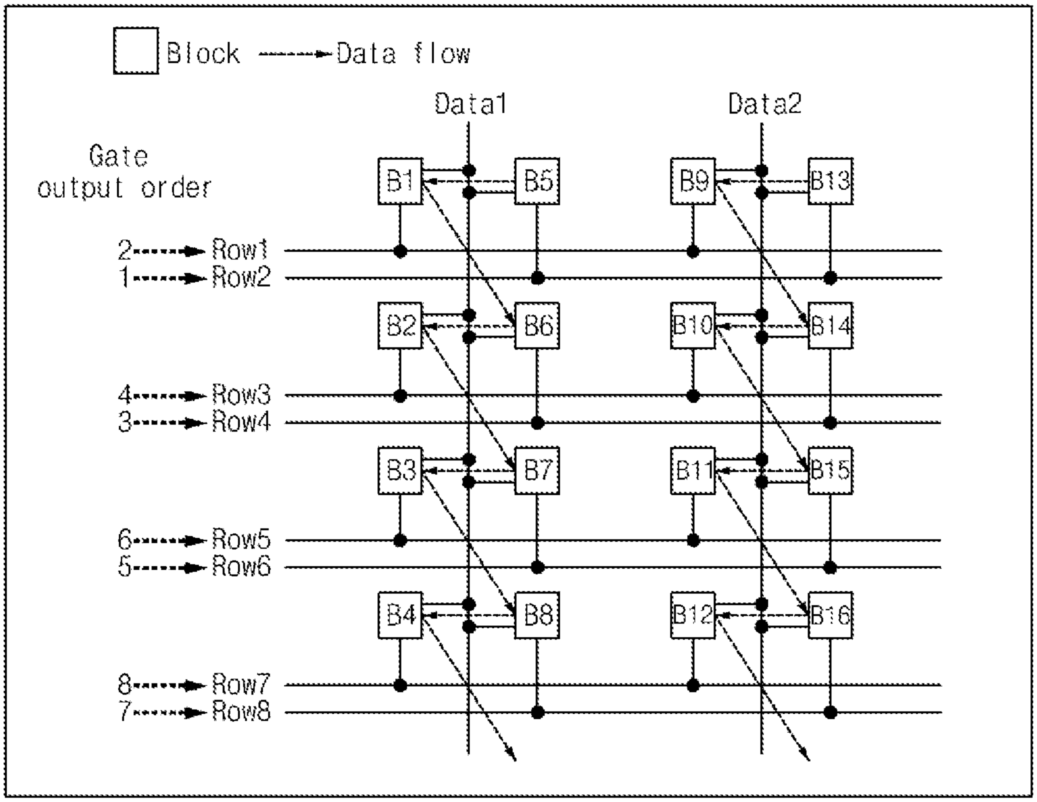
Figure 12D:
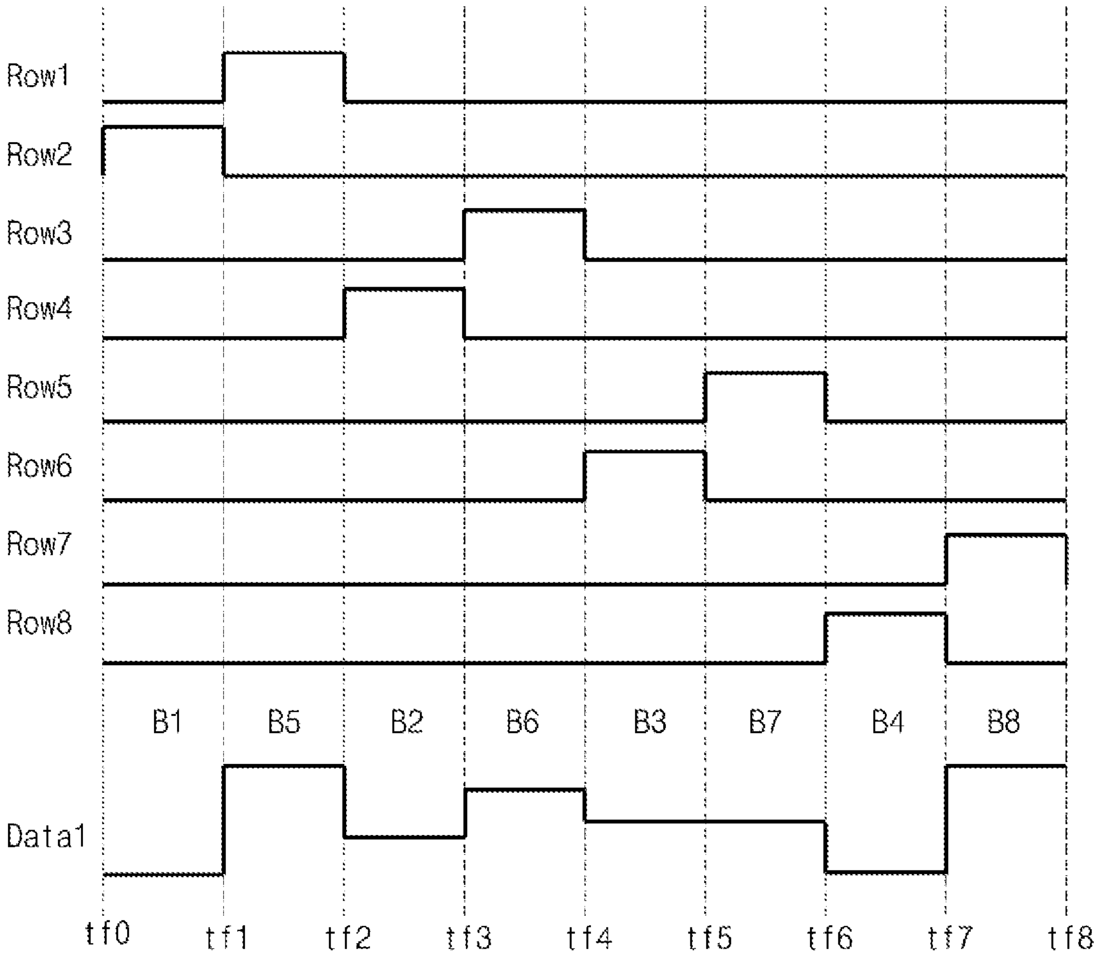

FIGS. 12C and 12D are views illustrating gate signals supplied during the second frame period after the first frame period.

Referring to the figures, the gate driver MC1 may output the first gate signal to the second row line Row2 during the first period from tf0 to tf1 within the second frame period after the first frame period, output the second gate signal to the first row line Row1 during the second period from tf1 to tf2 after the first period, output the third gate signal to the fourth row line Row4 during the third period from tf2 to tf3 after the second period, and output the fourth gate signal to the third row line Row3 during the fourth period from tf3 to tf4 after the third period.

Accordingly, the fifth light source B5 in the first horizontal line is turned on during the first period from tf0 to tf1 in the second frame period, the first light source B1 in the first horizontal line is turned on during the second period from tf1 to tf2 in the second frame period, the sixth light source B6 in the second horizontal line is turned on during the third period from tf2 to tf3 within the second frame period, and the second light source B2 is turned on during the fourth period from tf3 to tf4 within second frame period.

In FIGS. 12C and 12D, unlike FIGS. 12A and 12B, it is possible to reduce a luminance deviation between adjacent light sources by turning on the light sources disposed in the second vertical line rather than the first vertical line first.

Figure 12E:
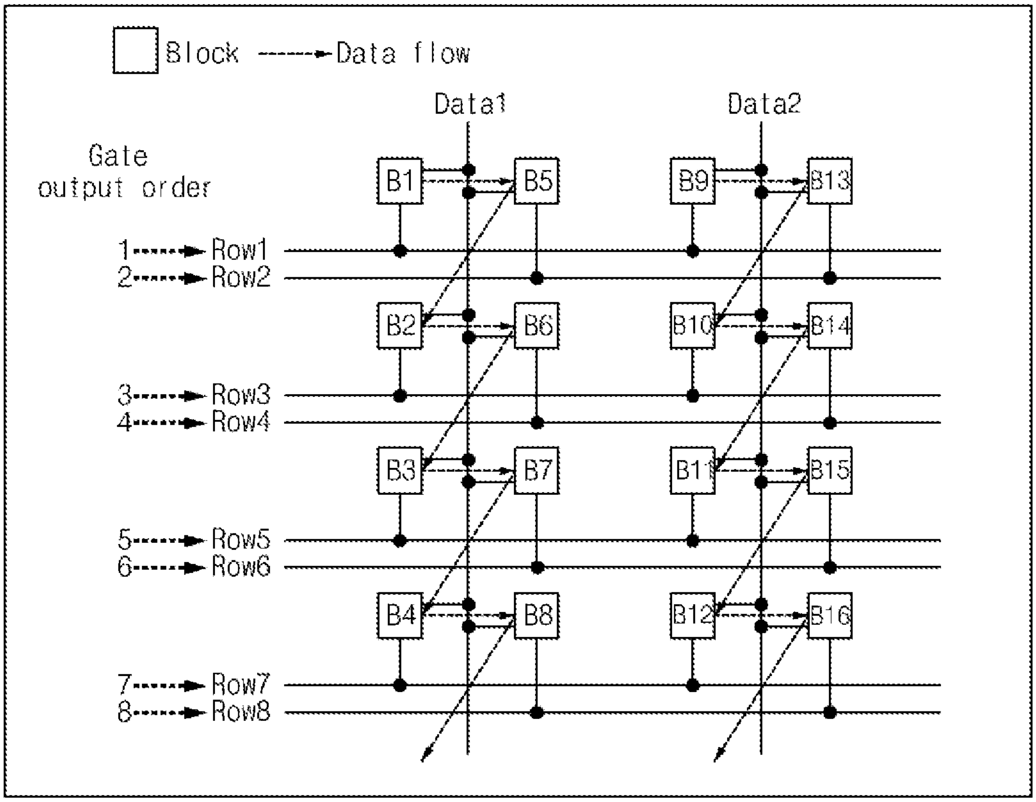
Figure 12F:
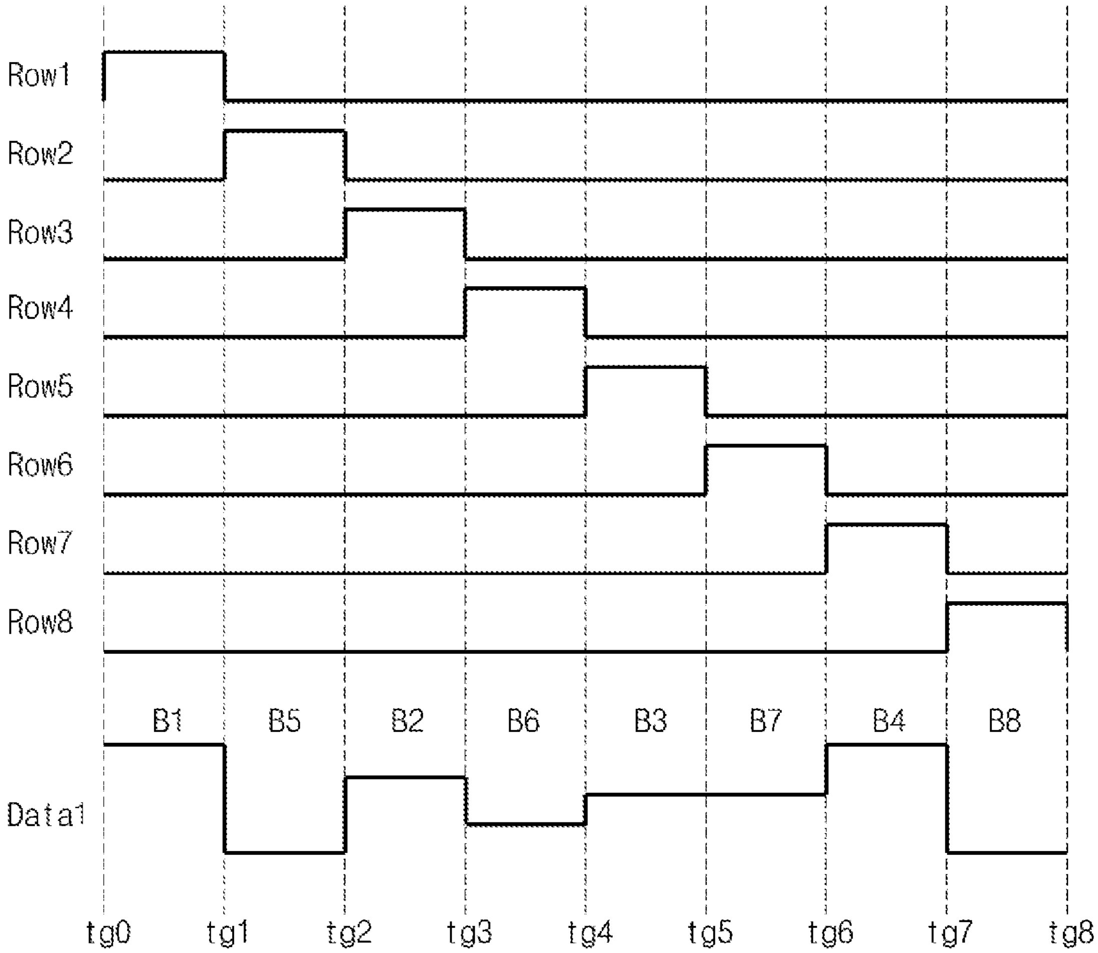

FIGS. 12E and 12F are views diagrams illustrating gate signals supplied during the third frame period after the second frame period.

Referring to the figures, the gate driver MC1 outputs the first gate signal to the first row line Row1 during a first period from tg0 to tg1 within the third frame period, outputs the second gate signal to the second row line Row2 during a second period from tg1 to tg2, after the first period, outputs the third gate signal to the third row line Row3 during a third period from tg2 to tg3 after the second period, and outputs the fourth gate signal to the fourth row line Row4 during a fourth period from tg3 to tg4 after the third period.

As shown, by sequentially applying the gate signals to the first row line Row1 to the fourth row line Row4, the light source B1 in the first horizontal line is turned on during the first period from tg0 to tg1 within the third frame period, the fifth light source B5 adjacent to the first light source B1 in the first horizontal line is turned on during the second period from tg1 to tg2 within the third frame period, the second light source B2 in the second horizontal line is turned on during the third period from tg2 to tg3 within the third frame period, and the sixth light source B6 adjacent to the second light source B2 in the second horizontal line is turned on during the fourth period from tg3 to tg4 within the third frame period.

Referring to FIGS. 12E and 12F, similarly to FIGS. 12A and 12B, it is possible to reduce a luminance deviation between adjacent light sources by turning on the light sources disposed in the first vertical line rather than the second vertical line.

Figure 13A:
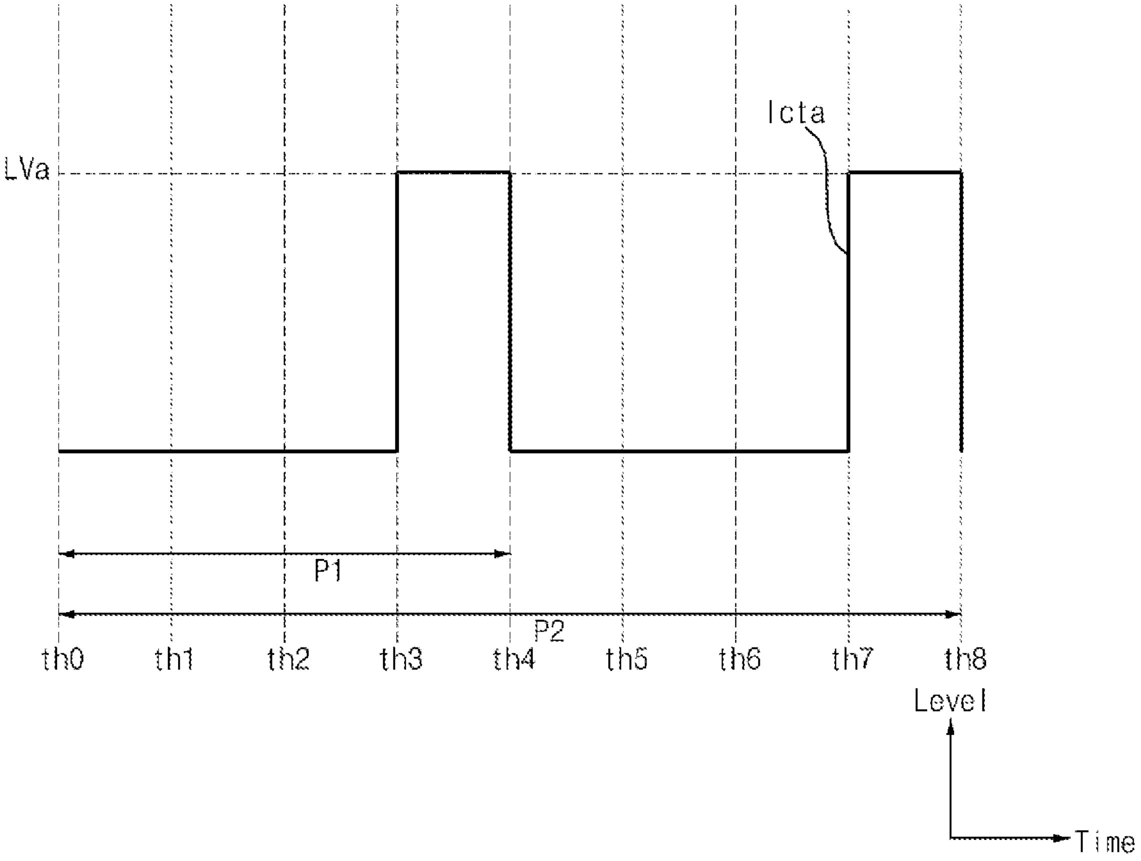

FIG. 13A illustrates an example of a current Icta flowing through a light source in the image display apparatus 800 of FIG. 10.

Referring to the figure, in the image display apparatus 800 of FIG. 10, the data drivers Dc1 to Dc3 may output a data signal at a first frequency and a gate signal at a first frequency to a plurality of light sources.

Accordingly, as shown in the figure, a first current ICta flows through the first light source B1.

In the figure, in a period from th0 to th8, a period from th0 to th4 that is a period P1 may correspond to a first period corresponding to the first frequency, and a period from th4 to th8 may correspond to a second period corresponding to the first frequency.

The gate signal at the first frequency is applied to the first light source B1 during the period from th0 to th4, and when a high-level data signal is applied to the first light source B1 during the period from th3 to th4 which is a part of the period from th0 to th4, a current having a first level LVa flows through the first light source B1.

Meanwhile, when the data signal is a PWM signal, the luminance of light emitted from the first light source B1 varies according to the pulse width or duty of the data signal during the period from th0 to th4.

For example, the higher the grayscale level allocated to the first light source B1, the greater the pulse width or duty of the data signal during the period from th0 to th4. Accordingly, the luminance of light emitted from the first light source B1 increases.

As another example, the lower the grayscale level allocated to the first light source B1, the smaller the pulse width or duty of the data signal during the period th0 to th4 becomes smaller, and accordingly, the luminance of the light emitted from the first light source B1 decreases.

Meanwhile, as the pulse width or duty of the data signal during the period from th0 to th4 decreases, the possibility of occurrence of flicker increases.

Figure 13B:
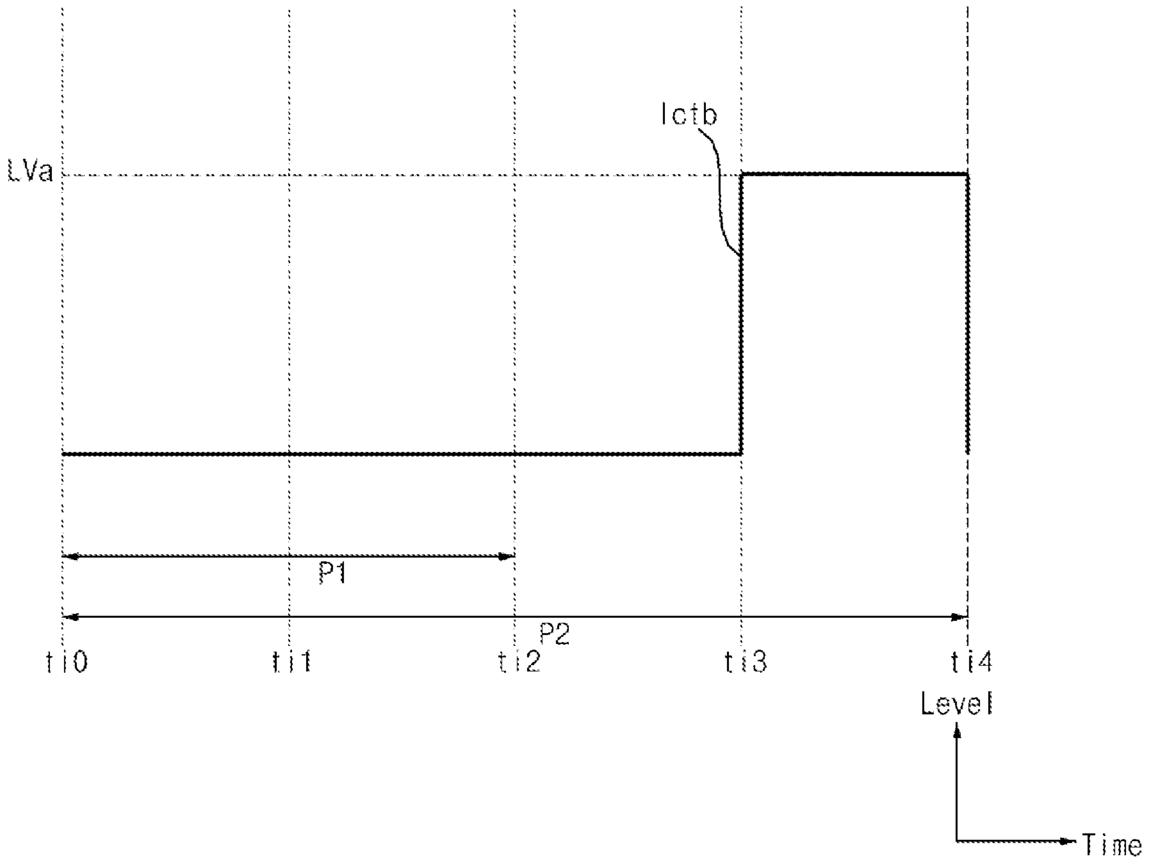

Accordingly, the data driver DC1 in the image display apparatus 800 according to the embodiment of the present disclosure may output a data signal at the first frequency to the first light source B1, as shown in FIG. 13A, when the grayscale level allocated to the first light source B1 among the light sources B1 to B4 disposed in the first vertical line among the plurality of light sources B1 to Bn exceeds a first reference level, and output a data signal at a second frequency lower than the first frequency to the first light source B1, as shown in FIG. 13B, when the grayscale level allocated to the first light source B1 is equal to or less than the first reference level.

For example, when the first light source B1 is assigned to black image display, it is desirable that the data driver DC1 in the image display apparatus 800 according to the embodiment of the present disclosure output the data signal at the second frequency lower than the first frequency. Accordingly, it is possible to compensate for increase in a driving frequency for light sources in a low-grayscale region and reduce the occurrence of flicker in the light sources in the low-grayscale region.

Similarly, the data driver DC1 in the image display apparatus 800 according to the embodiment of the present disclosure may control a current having a first frequency to flow through the first light source B1 when the grayscale level allocated to the first light source B1 among the light sources B1 to B4 disposed in the first vertical line among the plurality of light sources B1 to Bn exceeds the first reference level, and control a current having a second frequency lower than the first frequency to flow through the first light source B1 when the grayscale level allocated to the first light source B1 is equal to or less than the first reference level. Accordingly, it is possible to compensate for increase in the driving frequency for the light sources in the low-gray scale region.

Meanwhile, the first reference level may be 15 to 20 grayscales based on approximately 255 grayscales.

FIG. 13B illustrates another example of a current Ictb flowing through a light source in the image display apparatus 800 of FIG. 10.

Referring to the figure, in the image display apparatus 800 of FIG. 10, the data drivers Dc1 to Dc3 may output a data signal having a second frequency lower than the first frequency and a gate signal having the second frequency to a plurality of light sources.

Accordingly, as shown in the figure, a second current ICtb flows through the first light source B1.

In the figure, a period from ti0 to ti4 corresponds to the second frequency, and a period from ti0 to ti2 corresponds to the period P1 in FIG. 13A.

That is, the period P1 corresponds to the first frequency in FIG. 13A, whereas a period twice the period P1 corresponds to the second frequency in FIG. 13B.

Meanwhile, the gate signal at the second frequency is applied to the first light source B1 during the period from ti0 to ti4, and when a high-level data signal is applied to the first light source B1 during the period from ti3 to ti4 which is a part of the period from ti0 to ti4, a current having a first level LVa flows through the first light source B1.

When the data signal is a PWM signal, the luminance of light emitted from the first light source B1 varies according to the pulse width or duty of the data signal during the period from ti0 to ti4.

The data driver DC1 in the image display apparatus 800 according to the embodiment of the present disclosure may output a data signal having the second frequency lower than the first frequency to the first light source B1, as shown in FIG. 13B, when the grayscale level allocated to the first light source B1 is equal to or less than the first reference level.

Further, the data driver DC1 in the image display apparatus 800 according to the embodiment of the present disclosure may control a current having the second frequency lower than the first frequency to flow through the first light source B1 when the grayscale level allocated to the first light source B1 is equal to or less than the first reference level. Accordingly, it is possible to compensate for increase in the driving frequency for the light sources in the low-grayscale region.

Figure 14A:
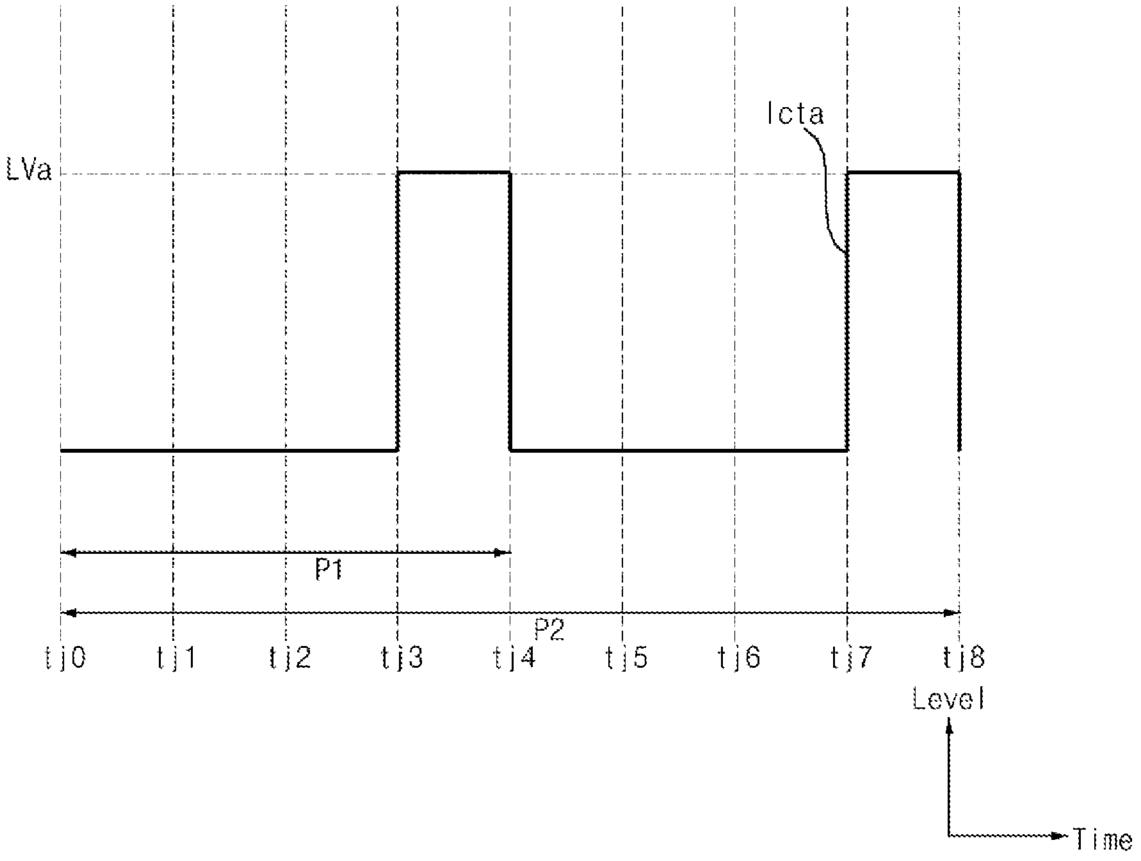

FIG. 14A illustrates an example of a current Icta flowing through a light source in the image display apparatus 800 of FIG. 10.

The figure illustrates that a first current ICta flows through the first light source B1 during a period from tj0 to tj8.

In the figure, a period from tj0 to tj4 which is a period P1 in the period from tj0 to tj8 may correspond to a first period, and a period from tj4 to tj8 may correspond to a second period.

A gate signal having a first level is applied to the first light source B1 during the period from tj0 to tj4, and when a high-level data signal is applied to the first light source B1 during the period from tj3 to tj4 which is a part of the period from tj0 to tj4, a current having the first level LVa flows through the first light source B1.

For example, the higher the grayscale level allocated to the first light source B1, the greater the pulse width or duty of the data signal during the period from tj0 to tj4*m*, and accordingly, the luminance of light emitted from the first light source B1 increases.

As another example, the lower the grayscale level allocated to the first light source B1, the smaller the pulse width or duty of the data signal during the period from tj0 to tj4, and accordingly, the luminance of the light emitted from the first light source B1 decreases.

Meanwhile, as the pulse width or duty of the data signal during the period from tj0 to tj4 decreases, the possibility of occurrence of flicker increases.

Figure 14B:
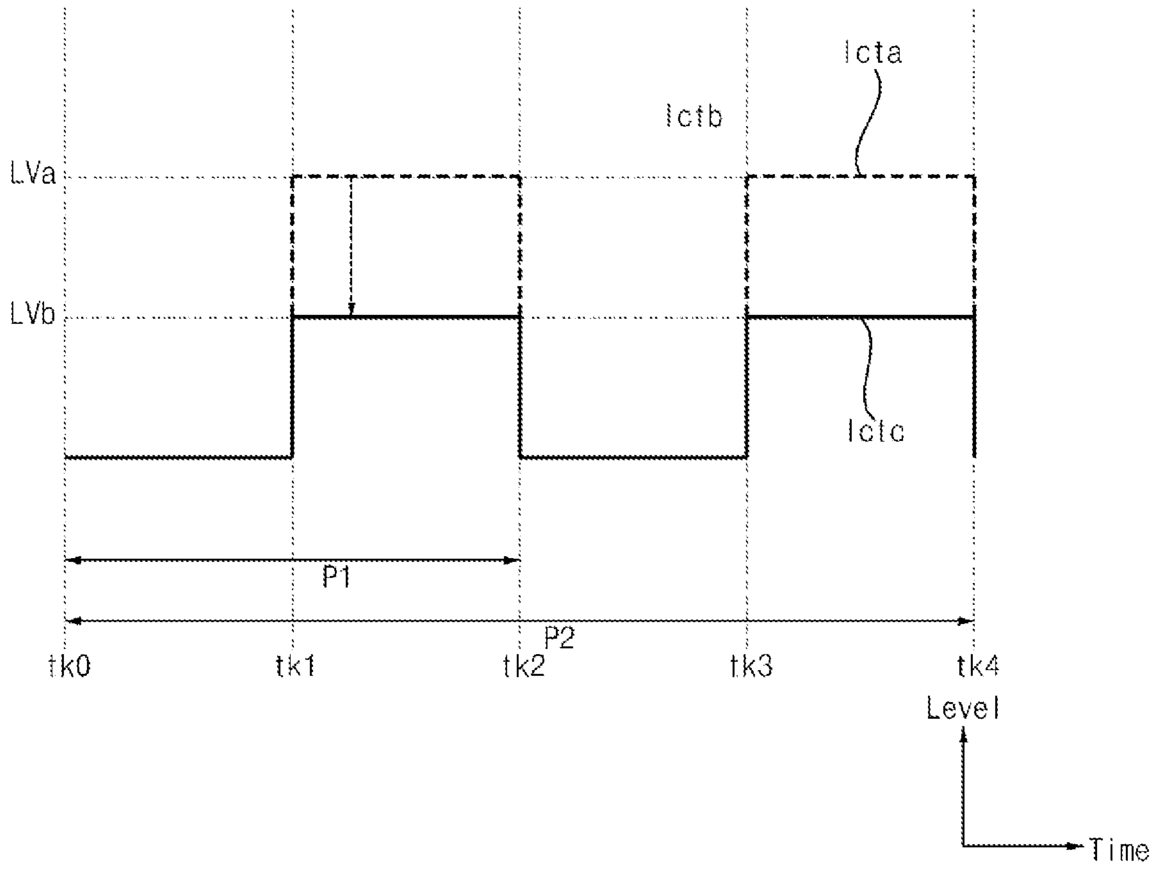

Accordingly, the data driver DC1 in the image display apparatus 800 according to the embodiment of the present disclosure may output a data signal having the first level LVa to the first light source B1, as shown in FIG. 14A, when the grayscale level allocated to the first light source B1 exceeds the first reference level, and output a data signal having a second level LVb lower than the first level LVa to the first light source B1, as shown in FIG. 14B, when the grayscale level allocated to the first light source B1 is equal to or less than the first reference level. For example, when the first light source B1 is allocated to black image display, it is desirable that the data driver DC1 in the image display apparatus 800 according to the embodiment of the present disclosure output a data signal having the second level LVb lower than the first level LVa. Accordingly, it is possible to compensate for increase in the driving frequency for the light sources in the low-grayscale region and reduce the occurrence of flicker in the light sources in the low-grayscale region.

Similarly, the data driver DC1 in the image display apparatus 800 according to the embodiment of the present disclosure may control a current having the first level LVa to flow through the first light source B1 when the grayscale level allocated to the first light source B1 among the light sources B1 to B4 disposed in the first vertical line among the plurality of light sources B1 to Bn exceeds the first reference level, and control a current having the second level LVb lower than the first level LVa to flow through the first light source B1 when the grayscale level allocated to the first light source B1 is equal to or less than the first reference level. Accordingly, it is possible to compensate for increase in the driving frequency for the light sources in the low-grayscale region.

Meanwhile, the first reference level may be 15 to 20 grayscales based on approximately 255 grayscales.

FIG. 14B illustrates another example of a current Ictc flowing through a light source in the image display apparatus 800 of FIG. 10.

The figure illustrates that a current having the second level LVb lower than the first level LVa flows through the first light source B1 during a period from tk1 to tk2 in a period from tk0 to tk4, and a current Ictc having the second level LVb lower than the first level LVa flows through the first light source B1 during a period from tk3 to tk4.

The data driver DC1 in the image display apparatus 800 according to the embodiment of the present disclosure may output a data signal having the second level LVb lower than the first level LVa to the first light source B1, as shown in FIG. 14B, when the grayscale level allocated to the first light source B1 is equal to or less than the first reference level.

Further, the data driver DC1 in the image display apparatus 800 according to the embodiment of the present disclosure may control the current Ictc having the second level LVb lower than the first level LVa to flow through the first light source B1 when the grayscale level allocated to the first light source B1 is equal to or less than the first reference level. Accordingly, it is possible to compensate for increase in the driving frequency for the light sources in the low-grayscale region.

Figure 15A:
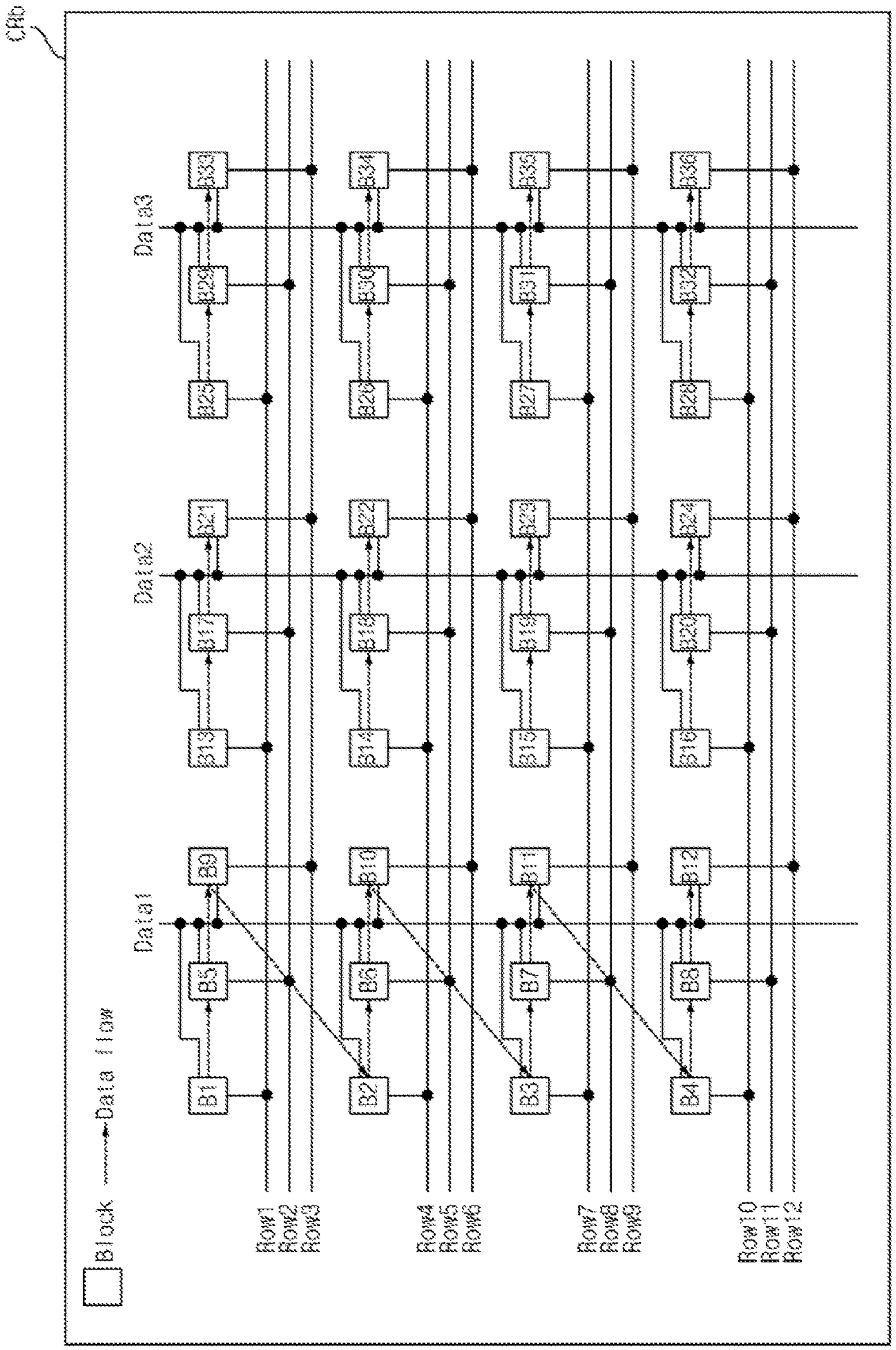
FIG. 15A is an exemplary internal block diagram of an image display apparatus according to another embodiment of the present disclosure.

FIG. 15A is an exemplary internal block diagram of an image display apparatus according to another embodiment of the present disclosure.

Referring to the figure, the image display apparatus 800 according to another embodiment of the present disclosure includes a panel 210, a plurality of light sources B1 to Bn outputting light to the panel 210, a plurality of data drivers that output data signals to the plurality of light sources B1 to Bn, and a plurality of gate drivers MC1 to MC5 that output gate signals to the plurality of light sources B1 to Bn, and among the plurality of light sources B1 to Bn, light sources B1 to B4 disposed in the first vertical line, light sources B5 to B8 disposed in the second vertical line, and light sources B9 to B12 disposed in the third vertical line are commonly connected to the first data line Data1.

A light source circuit CRb in the image display apparatus 800 according to another embodiment of the present disclosure includes a plurality of light sources B1 to B12.

Among the plurality of light sources B1 to B12, the light sources B1 to B4 disposed in the first vertical line, the light sources B5 to B8 disposed in the second vertical line, and the light sources B9 to B12 disposed in the third vertical line are is commonly connected to the first data line Data1.

Accordingly, it is possible to display an image by efficiently using data drivers.

In particular, as compared to the light source circuit CRy of FIG. 9B, the number of data lines is reduced by ⅓ according to the light source circuit CRb of FIG. 15A, and thus the number of data drivers can be reduced to approximately ⅓.

Meanwhile, since the common first data line Data1 is connected to the first to third vertical lines, the number of gate lines may increase threefold.

The figure illustrates that the first row line Row1 is connected to the first light source B1 in the first horizontal line, the second row line Row2 is connected to the fifth light source B5 in the first horizontal line, and the third row line Row3 is connected to the ninth light source B9 in the first horizontal line.

That is, the figure illustrates that three row lines are used for one horizontal line, and thus a total of 12 row lines are provided.

Meanwhile, the data driver DCc1 may output a first data signal for driving the light sources disposed in the first vertical line to the first data line Data1 during a first period, output a second data signal for driving the light sources disposed in the second vertical line the first data line Data1 during a second period after the first period, and output a third data signal for driving the light sources disposed in the third vertical line to the first data line Data1 during a third period after the second period.

Accordingly, it is possible to turn on the first light source B1, the fifth light source B5, and the ninth light source B9 commonly connected to the first data line at different points in time in a time division manner.

Figure 15B:
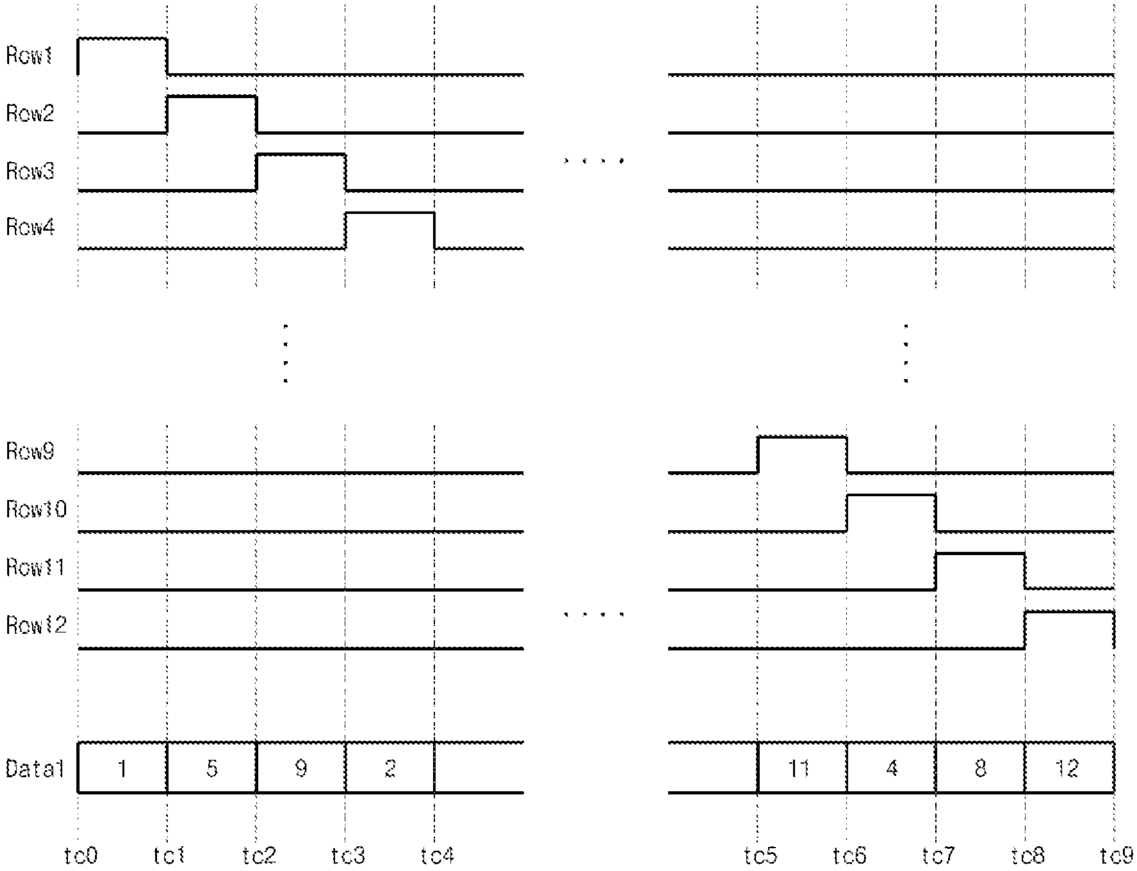
FIG. 15B is a view referred to in description of FIG. 15A.

FIG. 15B is a view referred to in description of FIG. 15A.

Referring to the figure, gate signals having a high level are sequentially applied to the first row line Row1 to the twelfth row line Row12.

The figure illustrates that gate signals having a high level are sequentially applied to the first row line Row1 to the twelfth row line Row12 during a period from tc0 to tc9.

According to the data signal applied to the first data line Data1, the first light source B1, the fifth light source B5, the ninth light source B9, the second light source B2, and the like are sequentially turned on.

Figure 16A:
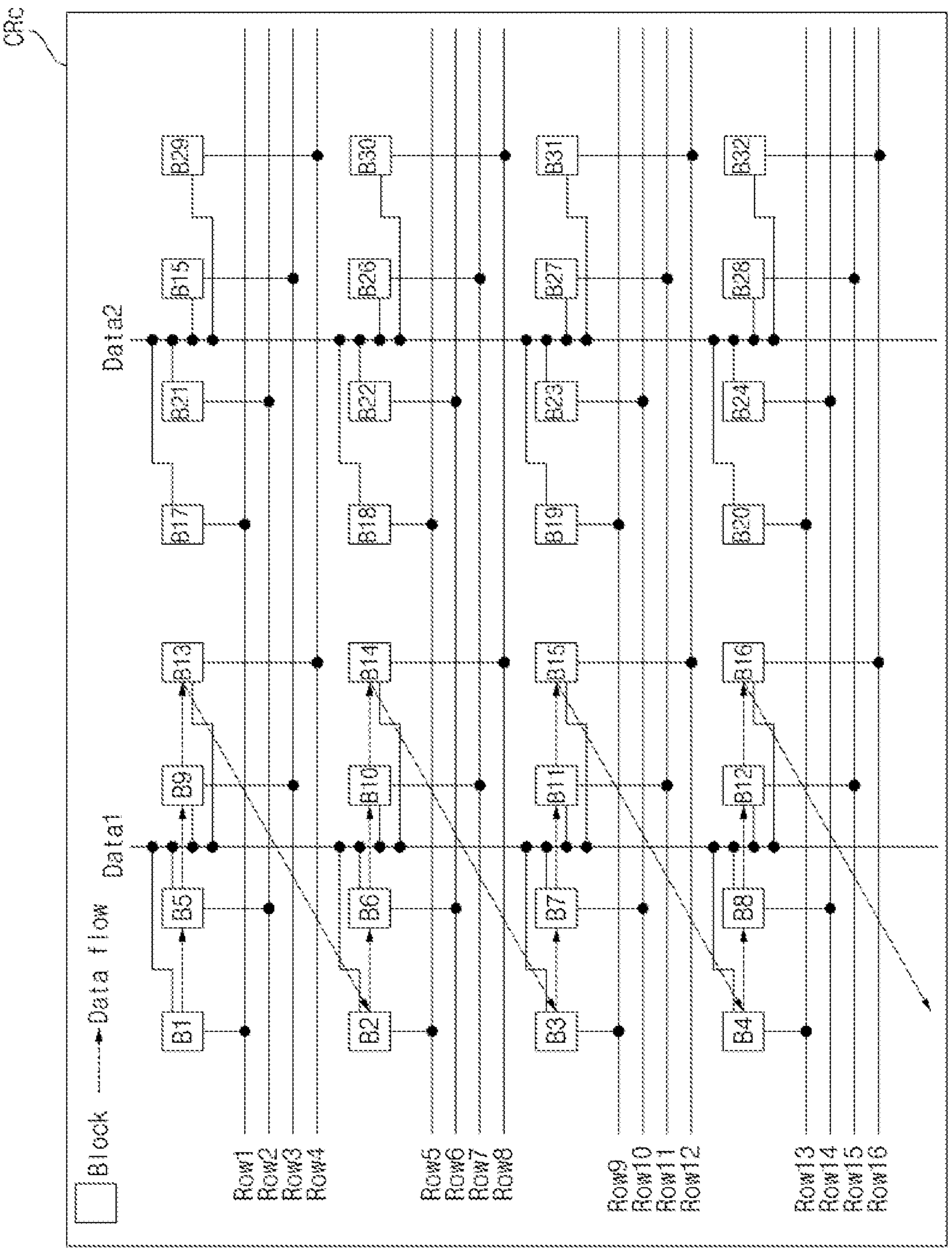
FIG. 16A is an exemplary internal block diagram of an image display apparatus according to another embodiment of the present disclosure.

FIG. 16A is an exemplary internal block diagram of an image display apparatus according to another embodiment of the present disclosure.

Referring to the figure, the image display apparatus 800 according to another embodiment of the present disclosure includes a panel 210, a plurality of light sources B1 to Bn that output light to the panel 210, a plurality of data drivers that output data signals to the plurality of light sources B1 to Bn, and a plurality of gate drivers MC1 to MC5 that output gate signals to the plurality of light sources B1 to Bn, and among the plurality of light sources B1 to Bn, light sources B1 to B4 disposed in the first vertical line, light sources B5 to B8 disposed in the second vertical line, light sources B9 to B12 disposed in the third vertical line, and light sources B13 to B16 disposed in the fourth vertical line are commonly connected to the first data line Data1.

A light source circuit CRc in the image display apparatus 800 according to another embodiment of the present disclosure includes a plurality of light sources B1 to B16.

Among the plurality of light sources B1 to B16, the light sources B1 to B4 disposed in the first vertical line, the light sources B5 to B8 disposed in the second vertical line, the light sources B9 to B12 disposed in the third vertical line, and the light sources B13 to B16 disposed in the fourth vertical line are commonly connected to the first data line Data1.

Accordingly, it is possible to display an image by efficiently using the data drivers.

In particular, as compared to the light source circuit CRy of FIG. 9B, the number of data lines is reduced by ¼ according to the light source circuit CRc of FIG. 16A, and thus the number of data drivers can be reduced to approximately ¼.

Further, since the common first data line Data1 is connected to the first to fourth vertical lines, the number of gate lines can be increased by four times.

The figure illustrates that the first row line Row1 is connected to the first light source B1 in the first horizontal line, the second row line Row2 is connected to the fifth light source B5 in the first horizontal line, the third row line Row3 is connected to the ninth light source B9 in the first horizontal line, and the fourth row line Row4 is connected to the thirteenth light source B13 in the first horizontal line.

That is, the figure illustrates that four row lines are used for one horizontal line, and thus a total of sixteen row lines are provided.

Further, the data driver DCc1 may output a first data signal for driving light sources disposed in the first vertical line to the first data line Data1 during a first period, output a second data signal for driving light sources disposed in the second vertical line to the first data line Data1 during a second period after the first period, output a third data signal for driving light sources disposed in the third vertical line to the first data line Data1 during a third period after the second period, and output a fourth data signal for driving light sources disposed in the fourth vertical line to the first data line Data1 during a fourth period after the third period.

Accordingly, the first light source B1, the fifth light source B5, the ninth light source B9, and the thirteenth light source B13, which are commonly connected to the first data line, can be turned on at different points in time in a time division manner.

Figure 16B:
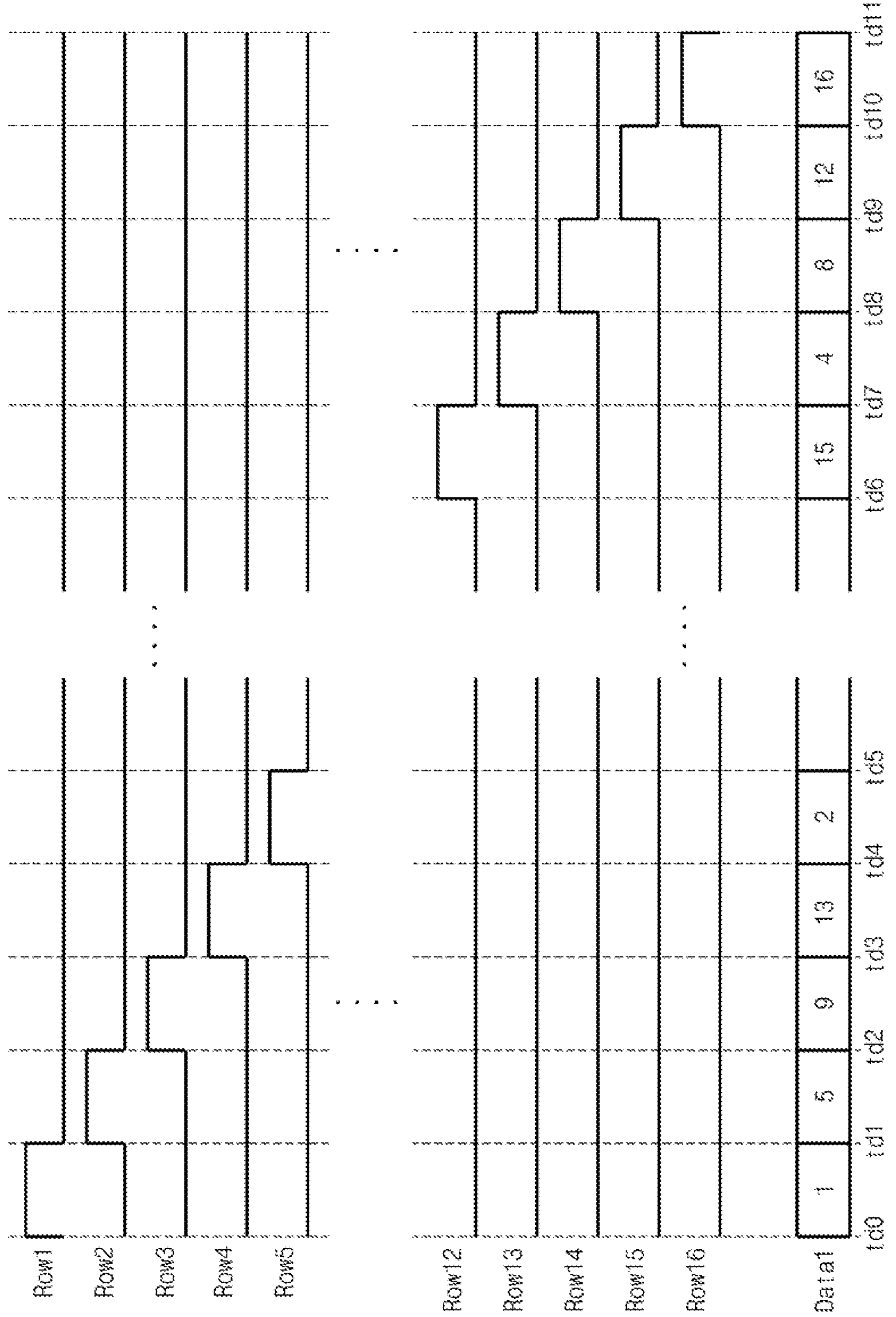
FIG. 16B is a view referred to in description of FIG. 16A.

FIG. 16B is a view referred to in description of FIG. 16A.

Referring to the figure, gate signals having a high level are sequentially applied to the first row line Row1 to the sixteenth row line Row16.

The figure illustrates that gate signals having a high level are sequentially applied to the first row line Row1 to the sixteenth row line Row16 during a period from td0 to td11.

Meanwhile, according to the data signal applied to the first data line Data1, the first light source B1, the fifth light source B5, the ninth light source B9, the thirteenth light source B13, and the second light source B2 are sequentially turned on.

Referring to FIGS. 10 to 16B, as the number of light sources commonly connected to the first data line Data1 increases, the number of data drivers may decrease. Accordingly, it is possible to display an image by efficiently using the data drivers.

Further, as the number of light sources commonly connected to the first data line Data1 increases, the frequencies of the data signals and the gate signals may increase. Accordingly, it is possible to display an image by efficiently using the data drivers.

An image display apparatus according to an embodiment of the present disclosure includes a panel, a plurality of light sources configured to output light to the panel, a plurality of data drivers configured to output data signals to the plurality of light sources, and a plurality of gate drivers configured to output gate signals to the plurality of light sources, wherein among the plurality of light sources, light sources disposed in a first vertical line and light sources disposed on a second vertical line are connected to a first data line. Accordingly, it is possible to display an image by efficiently using the data drivers. In particular, the number of data drivers can be significantly reduced as compared to a case in which the light sources disposed in the first vertical line and the light sources disposed in the second vertical line are connected to respective data lines instead of a common data line. Specifically, it can be reduced to about half.

The data drivers may output a first data signal for driving the light sources disposed in the first vertical line to a first data line during a first period, and output a second data signal for driving the light sources disposed in the second vertical line to the first data line during a second period after the first period. Accordingly, it is possible to display an image by efficiently using the data drivers.

The data drivers may output a third data signal for driving the light sources disposed in the first vertical line to the first data line during a third period after the second period. Accordingly, it is possible to display an image by efficiently using the data drivers.

The data drivers may control a first light source disposed in the first vertical line to be turned on during the first period and control a light source disposed in the second vertical line and adjacent to the first light source to be turned on during the second period after the first period. Accordingly, it is possible to display an image by efficiently using the data drivers.

The data drivers may control a second light source disposed in the first vertical line and positioned adjacently under the first light source to be turned on during the third period after the second period.

The first light source disposed in the first vertical line may be connected to a first row line, and the light source disposed in the second vertical line and adjacent to the first light source may be connected to a second row line under the first row line. Accordingly, it is possible to display an image by efficiently using the data drivers.

The second light source disposed in the first vertical line and positioned adjacently under the first light source may be connected to a third row line. Accordingly, it is possible to display an image by efficiently using the data drivers.

The gate drivers may output a first gate signal to the first row line during a first period, output a second gate signal to the second row line during a second period after the first period, and output a third gate signal to the third row line during a third period after the second period. Accordingly, it is possible to display an image by efficiently using the data drivers.

The gate drivers may control the first light source disposed in the first vertical line to be turned on during the first period, control the light source disposed in the second vertical line and adjacent to the first light source to be turned on during the second period after the first period, and control the second light source disposed in the first vertical line and positioned adjacently under the first light source during the third period after the second period. Accordingly, it is possible to display an image by efficiently using the data drivers.

The gate drivers may output a first gate signal to the first row line during a first period within a first frame period, output a second gate signal to the second row line during a second period after the first period, output a third gate signal to the third row line during a third period after the second period, output a fourth gate signal to the second row line during a first period within a second frame period after the first frame period, and output a fifth gate signal to the first row line during a second period after the first period. Accordingly, it is possible to reduce a luminance deviation between adjacent light sources.

The data drivers may control some of light sources disposed in a first horizontal line among the plurality of light sources to be turned on during the first period, and control some other light sources to be turned on during the second period after the first period. Accordingly, it is possible to display an image by efficiently using the data drivers.

The number of data drivers may decrease as the number of light sources commonly connected to the first data line increases. Accordingly, it is possible to display an image by efficiently using the data drivers.

Frequencies of the data signals and the gate signals may increase as the number of light sources commonly connected to the first data line increases. Accordingly, it is possible to display an image by efficiently using the data drivers.

The data drivers may output a data signal at a first frequency to the first light source when a grayscale level assigned to the first light source among the light sources disposed in the first vertical line among the plurality of light sources exceeds a first reference level, and output a data signal at a second frequency lower than the first frequency to the first light source when the grayscale level allocated to the first light source is equal to or less than the first reference level. Accordingly, it is possible to compensate for increase in a driving frequency for light sources in a low-grayscale region.

The data drivers may control a current having a first frequency to flow through the first light source when the grayscale level assigned to the first light source among the light sources disposed in the first vertical line among the plurality of light sources exceeds the first reference level and control a current having a second frequency lower than the first frequency to flow through the first light source when the grayscale level allocated to the first light source is equal to or less than the first reference level. Accordingly, it is possible to compensate for increase in a driving frequency for light sources in a low-grayscale region.

The data drivers may output a data signal having a first level to the first light source when the grayscale level assigned to the first light source among the light sources disposed in the first vertical line among the plurality of light sources exceeds the first reference level, and output a data signal having a second level lower than the first level to the first light source when the grayscale level allocated to the first light source is equal to or less than the first reference level. Accordingly, it is possible to compensate for increase in a driving frequency for light sources in a low-grayscale region.

The data drivers may control a current having a first level to flow through the first light source when the grayscale level assigned to the first light source among the light sources disposed in the first vertical line among the plurality of light sources exceeds the first reference level, and control a current having a second level lower than the first level to flow through the first light source when the grayscale level allocated to the first light source is equal to or less than the first reference level. Accordingly, it is possible to compensate for increase in a driving frequency for light sources in a low-grayscale region.

An image display apparatus according to another embodiment of the present disclosure includes a panel, a plurality of light sources configured to output light to the panel, a plurality of data drivers configured to output data signals to the plurality of light sources, and a plurality of gate drivers configured to output gate signals to the plurality of light sources, wherein among the plurality of light sources, light sources disposed in a first vertical line, light sources disposed in a second vertical line, and light sources disposed in a third vertical line are connected to a first data line. Accordingly, it is possible to display an image by efficiently using the data drivers. In particular, the number of data drivers can be significantly reduced as compared to a case in which the light sources disposed in the first vertical line and the light sources disposed in the second vertical line are connected to respective data lines instead of a common data line.

The data drivers may output a first data signal for driving the light sources disposed in the first vertical line to the first data line during a first period, output a second data signal for driving the light sources disposed in the second vertical line to the first data line during a second period after the first period, and output a third data signal for driving the light sources disposed in the third vertical line to the first data line during a third period after the second period. Accordingly, it is possible to display an image by efficiently using the data drivers.

An image display apparatus according to another aspect of the present disclosure includes a panel, a plurality of light sources configured to output light to the panel, a plurality of data drivers configured to output data signals to the plurality of light sources, and a plurality of gate drivers configured to output gate signals to the plurality of light sources, wherein among the plurality of light sources, light sources disposed in a first vertical line, light sources disposed in a second vertical line, light sources disposed in a third vertical line, and light sources disposed in a fourth vertical line are connected to a first data line. Accordingly, it is possible to display an image by efficiently using the data drivers. In particular, the number of data drivers can be significantly reduced as compared to a case in which the light sources disposed in the first vertical line and the light sources disposed in the second vertical line are connected to respective data lines instead of a common data line.

While the present disclosure has been particularly shown and described with reference to exemplary embodiments thereof, it will be understood by those of ordinary skill in the art that various changes in form and detail may be made herein without departing from the spirit and scope of the present disclosure as defined by the following claims and such modifications and variations should not be understood individually from the technical idea or aspect of the present disclosure.

What is claimed is:

1. An image display apparatus, comprising:

a panel;

a plurality of light sources configured to output light toward the panel, based on data signals and gate signals;

a plurality of data drivers configured to output the data signals to the plurality of light sources;

a plurality of gate drivers configured to output the gate signals to the plurality of light sources; and a first data line coupled to first light sources, among the plurality of light sources, that are disposed in a first vertical line, and is further coupled to second light sources, among the plurality of light sources, that are disposed in a second vertical line, wherein at least one of the data drivers is configured to:

control a current having a first frequency to flow through a first light source when a grayscale level assigned to the first light source, among the first light sources disposed in the first vertical line, exceeds a first reference level, and control a current having a second frequency lower than the first frequency, to flow through the first light source, when the grayscale level allocated to the first light source is equal to or less than the first reference level.

2. The image display apparatus according to claim 1, wherein the data drivers are configured to:

output a first data signal for driving the first light sources disposed in the first vertical line to the first data line during a first period, and output a second data signal for driving the second light sources disposed in the second vertical line to the first data line during a second period after the first period.

3. The image display apparatus according to claim 2, wherein the data drivers are configured to:

output a third data signal for driving the first light sources disposed in the first vertical line to the first data line during a third period after the second period.

4. The image display apparatus according to claim 3, wherein the data drivers are configured to:

control a first light source, from among the first light sources, to be turned on during the first period and control a second light source, from among the second light sources and adjacent to the first light source, to be turned on during the second period after the first period.

5. The image display apparatus according to claim 4, wherein the data drivers are configured to:

control a second light source, from among the first light sources disposed in the first vertical line and positioned adjacently under the first light source, to be turned on during the third period after the second period.

6. The image display apparatus according to claim 1, wherein a first light source disposed in the first vertical line is connected to a first row line, and a light source disposed in a second vertical line and adjacent to the first light source is connected to a second row line under the first row line.

7. The image display apparatus according to claim 6, wherein a second light source disposed in the first vertical line and positioned adjacently under the first light source is connected to a third row line.

8. The image display apparatus according to claim 7, wherein the gate drivers are configured to:

output a first gate signal to the first row line during a first period, output a second gate signal to the second row line during a second period after the first period, and output a third gate signal to the third row line during a third period after the second period.

9. The image display apparatus according to claim 7, wherein the gate drivers are configured to:

control the first light source disposed in the first vertical line to be turned on during the first period, control a light source disposed in the second vertical line and adjacent to the first light source to be turned on during the second period after the first period, and control a second light source disposed in the first vertical line and positioned adjacently under the first light source to be turned on during the third period after the second period.

10. The image display apparatus according to claim 7, wherein the gate drivers are configured to:

output a first gate signal to the first row line during a first period within a first frame period, output a second gate signal to the second row line during a second period after the first period, output a third gate signal to the third row line during a third period after the second period, output a fourth gate signal to the second row line during a first period within a second frame period after the first frame period, and output a fifth gate signal to the first row line during a second period after the first period.

11. The image display apparatus according to claim 1, wherein the data drivers are configured to:

control some light sources disposed in a first horizontal line, among the plurality of light sources, to be turned on during a first period, and control some other light sources, among the plurality of light sources, to be turned on during a second period after the first period.

12. The image display apparatus according to claim 1, wherein the number of the data drivers decreases as the number of light sources, among the plurality of light sources, commonly connected to the first data line increases.

13. The image display apparatus according to claim 1, wherein frequencies of the data signals and the gate signals increase as the number of light sources, among the plurality of light sources, commonly connected to the first data line increases.

14. The image display apparatus according to claim 1, wherein the at least one of the data drivers is configured to:

output a data signal at a first frequency to a first light source, when a grayscale level assigned to the first light source disposed in the first vertical line exceeds the first reference level, and output a data signal at a second frequency lower than the first frequency to the first light source, when the grayscale level allocated to the first light source is equal to or less than the first reference level.

15. The image display apparatus according to claim 1, wherein the at least one of the data drivers is configured to:

output a data signal having a first level to a first light source, when a grayscale level assigned to the first light source, among the first light sources disposed in the first vertical line, exceeds the first reference level, and output a data signal having a second level lower than the first level to the first light source, when the grayscale level allocated to the first light source is equal to or less than the first reference level.

16. The image display apparatus according to claim 1, wherein the at least one of the data drivers is configured to:

control a current having a first level to flow through a first light source, when a grayscale level assigned to the first light source, among the first light sources disposed in the first vertical line, exceeds the first reference level, and control a current having a second level lower than the first level to flow through the first light source, when the grayscale level allocated to the first light source is equal to or less than the first reference level.

17. An image display apparatus, comprising:

a panel;

a plurality of light sources configured to output light toward the panel, based on data signals and gate signals;

a plurality of data drivers configured to output the data signals to the plurality of light sources;

a plurality of gate drivers configured to output the gate signals to the plurality of light sources; and a first data line coupled to light sources, among the plurality of light sources, that are disposed in a first vertical line, light sources, among the plurality of light sources, disposed in a second vertical line, and light sources, among the plurality of light sources, disposed in a third vertical line, wherein at least one of the data drivers is configured to:

control a current having a first frequency to flow through a first light source when a grayscale level assigned to the first light source, among the first light sources disposed in the first vertical line, exceeds a first reference level, and control a current having a second frequency lower than the first frequency, to flow through the first light source, when the grayscale level allocated to the first light source is equal to or less than the first reference level.

18. The image display apparatus according to claim 17, wherein the data drivers are configured to:

output a first data signal for driving the light sources disposed in the first vertical line to the first data line during a first period, output a second data signal for driving the light sources disposed in the second vertical line to the first data line during a second period after the first period, and output a third data signal for driving the light sources disposed in the third vertical line to the first data line during a third period after the second period.

19. An image display apparatus comprising:

a panel;

a plurality of light sources configured to output light toward the panel, based on data signals and gate signals;

a plurality of data drivers configured to output the data signals to the plurality of light sources;

a plurality of gate drivers configured to output the gate signals to the plurality of light sources; and a first data line coupled to, among the plurality of light sources, light sources disposed in a first vertical line, light sources disposed in a second vertical line, light sources disposed in a third vertical line, and light sources disposed in a fourth vertical line, wherein at least one of the data drivers is configured to:

control a current having a first frequency to flow through a first light source when a grayscale level assigned to the first light source, among the first light sources disposed in the first vertical line, exceeds a first reference level, and control a current having a second frequency lower than the first frequency, to flow through the first light source, when the grayscale level allocated to the first light source is equal to or less than the first reference level.

* * * * *